(12) United States Patent
Elbert et al.

(10) Patent No.: US 11,785,270 B2
(45) Date of Patent: *Oct. 10, 2023

(54) APPROXIMATED PERSONALIZATION FOR WEAKLY CONNECTED DEVICES

(71) Applicant: Synamedia Limited, Staines Upon Thames (GB)

(72) Inventors: Dan Ariel Elbert, Jerusalem (IL); Vadim Kharitonsky, Kfar Adumim (IL); Zorach Reuven Wachtfogel, Elazar (IL)

(73) Assignee: Synamedia Limited, Staines Upon (GB)

( * ) Notice: Subject to any disclaimer, the term of this patent is extended or adjusted under 35 U.S.C. 154(b) by 0 days.

This patent is subject to a terminal disclaimer.

(21) Appl. No.: 17/829,662

(22) Filed: Jun. 1, 2022

(65) Prior Publication Data
US 2022/0295129 A1 Sep. 15, 2022

Related U.S. Application Data

(62) Division of application No. 17/158,412, filed on Jan. 26, 2021, now Pat. No. 11,418,824.

(51) Int. Cl.
*H04N 21/25* (2011.01)
*H04N 21/258* (2011.01)
*H04N 21/2668* (2011.01)

(52) U.S. Cl.
CPC ..... *H04N 21/251* (2013.01); *H04N 21/25891* (2013.01); *H04N 21/2668* (2013.01)

(58) Field of Classification Search
CPC ........... H04N 21/251; H04N 21/25891; H04N 21/2668
See application file for complete search history.

(56) References Cited

U.S. PATENT DOCUMENTS

| | | | |
|---|---|---|---|
| 10,244,286 B1* | 3/2019 | Jia | H04N 21/44224 |
| 2006/0294573 A1 | 12/2006 | Rogers et al. | |
| 2014/0214537 A1 | 7/2014 | Yoo et al. | |
| 2017/0103343 A1 | 4/2017 | Yee et al. | |
| 2018/0225710 A1* | 8/2018 | Kar | G06Q 30/0254 |

* cited by examiner

*Primary Examiner* — Nnenna N Ekpo
(74) *Attorney, Agent, or Firm* — Fernando & Partners LLP

(57) ABSTRACT

Techniques for targeting media content items for weakly connected devices are described. In some embodiments, a model building method in preparation for approximated personalization is performed at a server. The server uses data from fully connected devices to build a full model, which classifies profiles into clusters and tags targeted content with content rankings. The server also builds device models that approximate the full model. The server then sends the device models to user devices for targeted content selection. In some embodiments, a content selection method for approximated personalization is performed at a user device. The user device receives parameters of a device model trained by a server. The user device then executes the device model using local user data to assign a profile to a cluster and selects targeted content for the profile based on the cluster assignment and the rankings of the targeted content.

20 Claims, 14 Drawing Sheets

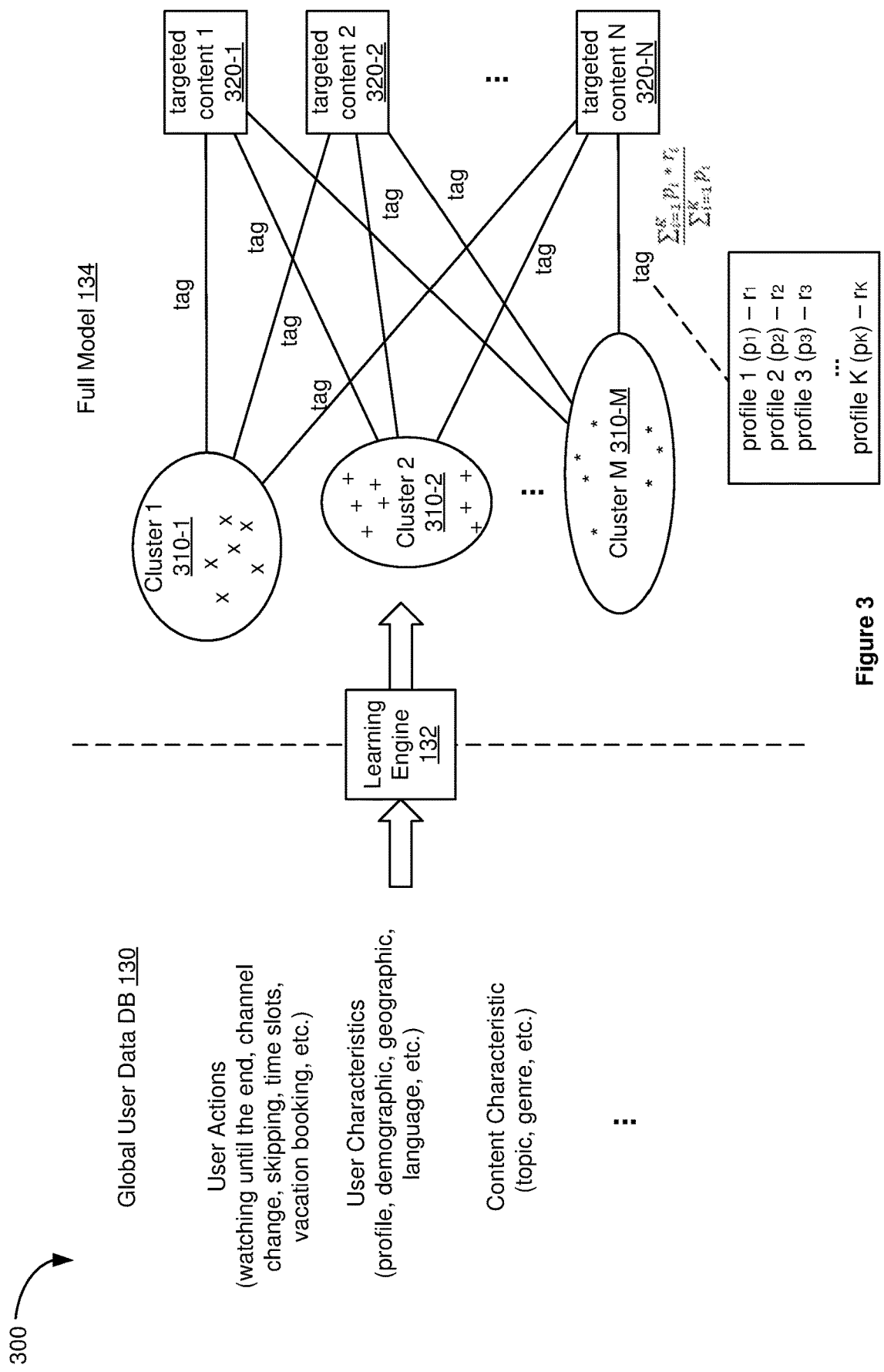

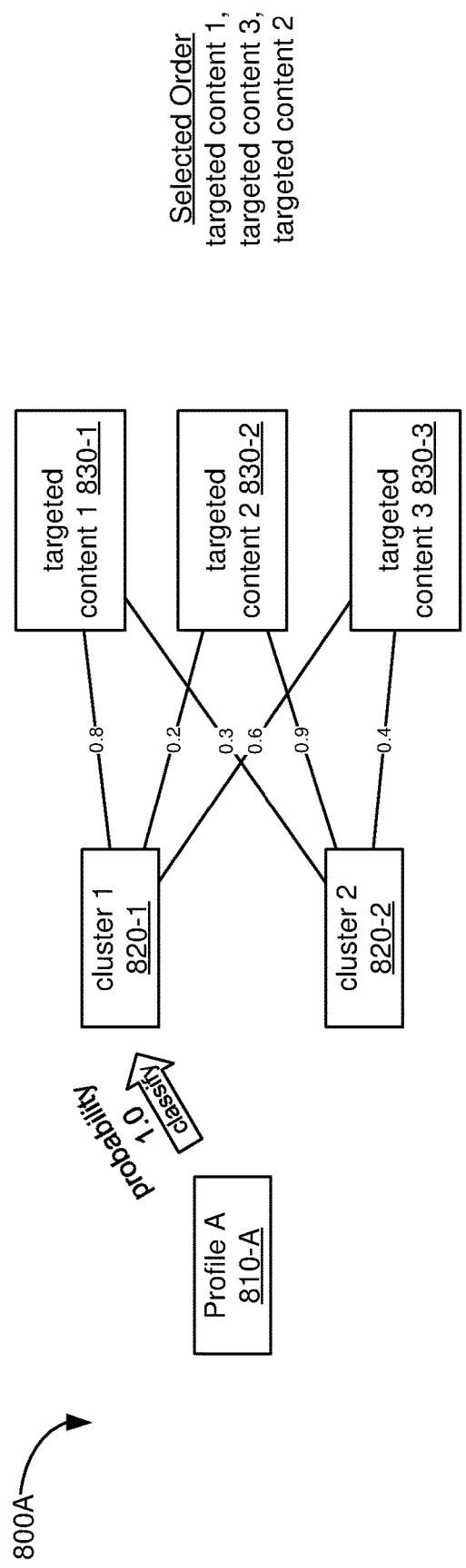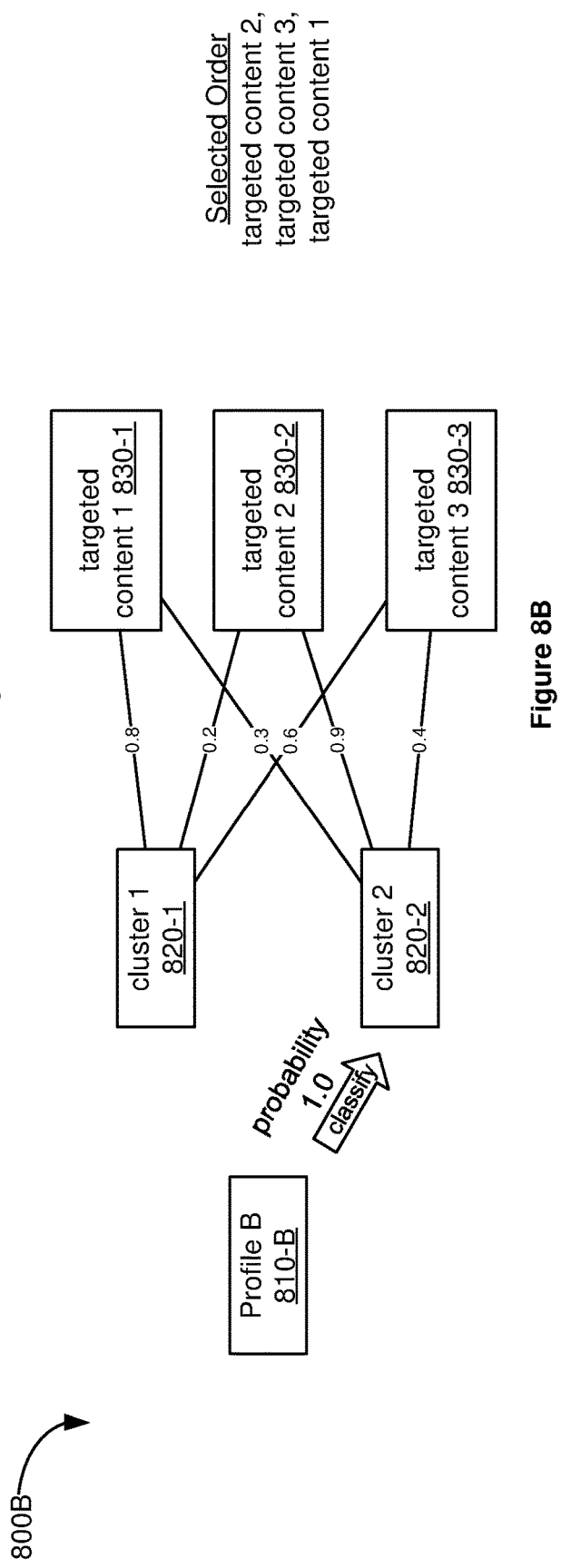
Figure 8A
Figure 8B

900B

Train multiple models for the user device, each of the multiple models has a subset of the features, wherein sending the parameters of the second model includes sending one or more of characteristics of the subset of the features and suitable device types to the user device, and the user device selects the second model from the multiple models based on characteristics of the user device and the one or more of the characteristics of the subset of the features and the suitable device types ~950

Send metadata indicating rankings of the features for the second model and default values of the features, wherein the user device executes the second model using a subset of the features and a subset of the default values ~960

Execute the first model to predict for the user device a first list of media content items and executing the second model to predict for the user device a second list of media content items; determine whether or not differences between the first list of media content items and the second list of media content items exceed a threshold; and send the first list of media content items in accordance with a determination that the differences exceed the threshold ~970

Receive, from the server, rankings of the features and default values of the features; determine a subset of the features based on the rankings and characteristics of the device; and store the user data corresponding to the subset of the features and the default values in the non-transitory memory — 1050

Execute the model to predict a set of media content items for a next period; and pre-fetch the set of media content items from the server prior to selecting the one or more media content items during the next period — 1060

The one or more device cluster assignments are generated based on the device user data during a current period, and the method further includes obtaining a set of device cluster assignments from a previous period; and updating the one or more device cluster assignments based on a weighted average of the one or more device cluster assignments and the set of device cluster assignments from the current period — 1070

Use a first set of device cluster assignments stored in a first buffer as the one or more device cluster assignments during a current period; store and update in a second buffer a second set of device cluster assignments during the current period; and use the second set of device cluster assignments stored in the second buffer as the one or more device cluster assignments at the end of the current period — 1080

Figure 10B

APPROXIMATED PERSONALIZATION FOR WEAKLY CONNECTED DEVICES

CROSS-REFERENCE TO RELATED APPLICATIONS

This application is a divisional of U.S. patent application Ser. No. 17/158,412, filed on Jan. 26, 2021, and hereby incorporated by reference in its entirety.

TECHNICAL FIELD

The present disclosure relates generally to targeting media content items and, more specifically, to machine learning based media content targeting for weakly connected devices.

BACKGROUND

Tailoring media content in a system according to user preference is a desirable feature. Through targeted advertisements, a headend delivers media content (e.g., recommended videos and/or advertisements) to users in which the users are most likely interested. When a user is connected in 2-way mode, the user, via the user device, typically receives media content from the headend. Also, via the user device, the user reports user actions to the headend. As such, for users using fully connected devices (e.g., 2-way devices), there are many ways to calculate what content is suitable for the user based on ample user information.

On the other hand, for users connecting through weakly connected devices, it is difficult for previously existing solutions to target content. For various reasons, e.g., 1-way connectivity, privacy settings, and/or guest or trial usage, etc., weakly connected devices often receive content from the headend but do not report user action data or will report limited user action data to the headend. Accordingly, with limited user action data, it is difficult for previously existing solutions to personalize targeted content for users at the weakly connected devices.

BRIEF DESCRIPTION OF THE DRAWINGS

So that the present disclosure can be understood by those of ordinary skill in the art, a more detailed description may be had by reference to aspects of some illustrative embodiments, some of which are shown in the accompanying drawings.

FIG. 3 is a diagram illustrating exemplary clustering and targeted content tagging, in accordance with some embodiments;

FIGS. 8A-8C are block diagrams illustrating exemplary cluster assignments and content selection, in accordance with some embodiments;

FIGS. 9A and 9B are flowcharts illustrating model building in preparation for approximated personalization of targeted content, in accordance with some embodiments;

FIGS. 10A and 10B are flowcharts illustrating targeted content selection for approximated personalization, in accordance with some embodiments;

Figure 1:
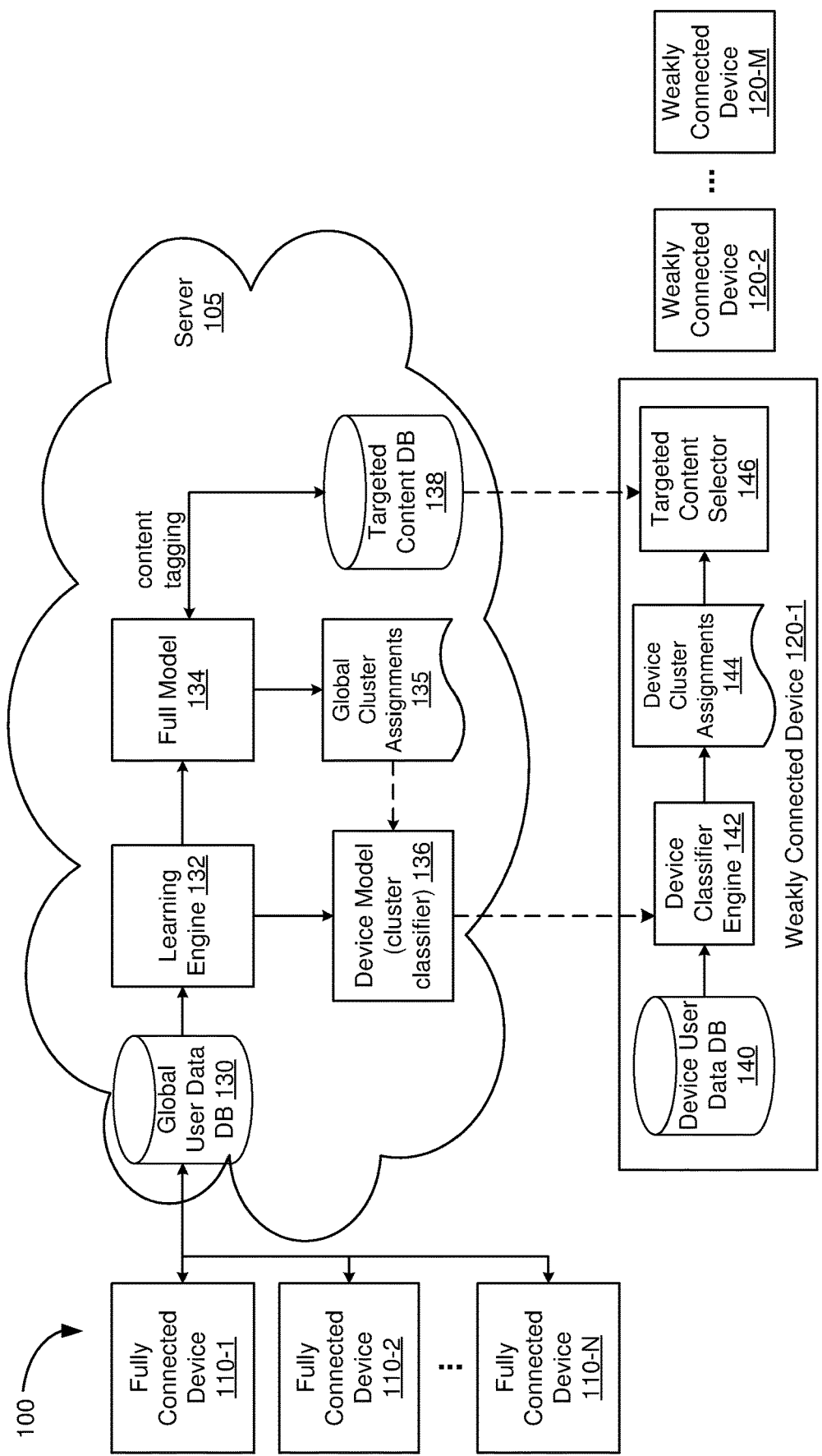
FIG. 1 is a block diagram of an exemplary content delivery system, in accordance with some embodiments.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method, or device. Finally, like reference numerals may be used to denote like features throughout the specification and figures.

DESCRIPTION OF EXAMPLE EMBODIMENTS

Numerous details are described in order to provide a thorough understanding of the example embodiments shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices, and circuits have not been described in exhaustive detail so as not to obscure more pertinent aspects of the example embodiments described herein.

Overview

In accordance with some embodiments, a media content delivery system collects user data from fully connected user devices, e.g., user devices with 2-way connectivity. Using user activities along with features of users and media content, a server in the content delivery system trains a full model that assigns profiles (e.g., user accounts, device profiles, user profiles corresponding to certain timeslots, etc.) into clusters and tags media content items with content rankings for each cluster. The server then trains simpler device models using the clusters as learning targets for weakly connected devices. The simpler device models thus approximate the cluster assignments learned by the full model and are simple enough to be run locally on weakly connected devices, which often have limited resources. In some embodiments, the simpler device models are delivered to the corresponding weakly connected devices in the same way as other data from the server, e.g., through a broadcasted data carousel. The weakly connected devices can then use the device models to predict targeted content for users at the weakly connected device. Users at fully connected devices and users at weakly connected devices typically belong to the same population in terms of behavior and preferences. Thus, when sufficient user data are collected from the fully connected devices, the media content delivery system described herein predicts targeted content with sufficient precision to achieve approximated personalization for users at the weakly connected devices.

In accordance with various embodiments, a model building method for preparing approximated personalization of targeted content is performed at a device (e.g., a server) with one or more processors and a non-transitory memory. The model building method includes obtaining user data from a set of user devices (e.g., a set of fully connected devices). The model building method further includes generating clusters and content tags of media content items. In some embodiments, the profiles are classified into the clusters by a first model (e.g., a full model) trained using the user data from the set of user devices. Further, in some embodiments, the content tags of the media content items include content rankings predicted for each of the media content items by the first model for each of the clusters. The model building method additionally includes generating, for a user device, a second model (e.g., a device model) using the clusters and based on features available on the user device. The model building method further includes sending parameters of the second model and the content tags to the user device.

In accordance with various embodiments, a media content selection method for approximated personalization is performed at a device (e.g., a user device) with a processor and a non-transitory memory. The media content selection method includes obtaining device user data associated with a profile. The media content selection method further includes receiving, from a server, parameters of a model and content tags of media content items, where the model is trained based on features available on the device and using clusters created by the server based on user data from a set of user devices and the content tags include content rankings of media content items for each of the clusters. The media content selection method also includes executing, based on the device user data, the model using the parameters to generate one or more device cluster assignments of the profile to one or more clusters of the clusters. The media content selection method further includes selecting one or more media content items for the profile based on the one or more device cluster assignments and the content tags.

Example Embodiments

The machine learning based media content targeting methods, systems, and devices described herein solve the aforementioned content personalization issues for weakly connected devices. As explained above, users at fully connected (e.g., 2-way connected) devices and users at weakly connected devices typically belong to the same population in terms of behaviors and preferences. On the server side, using data from fully connected devices, a server (e.g., a headend) applies machine learning to train a full model that divides users into clusters. Further, based on the full model, the server tags media content items with content rankings for each of the clusters. In some embodiments, the server stores the clusters as global cluster assignments and uses the global cluster assignments as learning targets to train one or more device models for each weakly connected device. The server then sends parameters of the trained device model(s) and the content tags of the media content items to the weakly connected devices for approximated personalization of targeted content.

On the client side, a weakly connected device accumulates local features and uses the device model trained by the server to classify the weakly connected device to a cluster. Based on the local classification and the content tags received from the server, the weakly connected device selects media content items. Because there are sufficient user data collected from the fully connected devices, the device model built based on such user data can predict, with sufficient precision, targeted media content for the weakly connected device to achieve approximated personalization. Relative to previously existing solutions that have insufficient data for targeted content prediction, the machine learning approach described herein improves the accuracy of content prediction for users at the weakly connected devices. Further, because the device model is simpler than the full model, the content selection process, including executing the lightweight device model, is efficient on user devices with limited resources. Additionally, various memory optimization techniques, as will be described in further detail below, enable optimized utilization of limited storage on user devices and at the same time ensure the accuracy of media content targeting.

Reference is now made to FIG. 1, which is a block diagram of an exemplary media content delivery system 100 in accordance with some embodiments. In some embodiments, the content delivery system 100 includes a server 105 (e.g., a headend) for media content delivery and a plurality of user devices for receiving and/or consuming the media content. The media content (also referred to hereinafter as "multimedia content", "media content item(s)", or "content") can include any multimedia data, e.g., visual data, audio data, and/or text, etc. As shown in FIG. 1, some of the plurality of user devices are fully connected devices 110-1, 110-2, . . . 110-N, collectively referred to hereinafter as the fully connected devices 110. Some of the user devices are weakly connected devices 120-1, 120-2, . . . 120-M, collectively referred to hereinafter as the weakly connected devices 120.

In some embodiments, the fully connected devices 110 are connected to the server 105 in 2-way mode. When in 2-way model, the fully connected devices 110 download the media content and metadata from the server 105 and upload user actions to the server 105. In some embodiments, the weakly connected devices 120 receive the media content from the server 105 but may not report or report limited user information to the server 105, e.g., due to a 1-way connection, privacy configuration, and/or the user device being used by a guest or a trial user.

In some embodiments, the server 105 includes a global user data database 130 for storing user data received from the fully connected devices 110, a learning engine 132, and a targeted content database 138 for storing tagged media content (e.g., advertisements, recommended videos, etc.). In some embodiments, the global user data database 130 stores user data received from the fully connected devices 110, including, but not limited to use actions (e.g., content selection, content ranking, skipping or watching until the end without skipping, etc.), user characteristics (e.g., user demographic and/or geographic data, etc.), and/or characteristics of media content consumed (e.g., advertisement topic, genre, etc.).

In some embodiments, the global user data database 130 also stores user data obtained from an external system, where such user data indicate user interests in certain media content items. For example, vacation booking information from a data broker indicates the purchaser is likely to be interested in advertisements related to vacation and/or media content items related to travel. As such, the global user data database 130 also stores such vacation booking information obtained from the external vacation booking system in accordance with some embodiments.

The data in the global user data database 130 reflect similarities as well as differences in behaviors and preferences among users. Using the data in the global user data database 130, the learning engine 132 learns user interests for different targeted content and builds a full model 134. In some embodiments, the user interests for different targeted content are represented by targeted content relevance rankings (also referred to hereinafter as the "targeted content ranking" or the "content ranking"), which are available to the system 100 through different means.

For example, a user can explicitly rank a media content item after accessing it. In another example, when a user watches an advertisement until the end without changing the channel or skipping the advertisement, the user action indicates that they are interested in the advertisement. As such, through the user action, the user implicitly ranks the advertisement as highly relevant. In some embodiments, the targeted content relevance rankings are obtained out-of-band, e.g., obtaining vacation booking information from a data broker. According to the vacation booking data, a user's frequent purchase indicates that advertisements about vacation destinations are highly relevant to the user and thus ranked high in the system for the user.

In some embodiments, the learning engine 132 periodically performs machine learning to build and/or train the full model 134 based on the input data from the global user data database 130. Based on the input data, the learning engine 132 learns which and/or the type of media content users are interested in. Once built, according to the full model 134, profiles with similar traits are assigned to the same cluster and for each targeted content in the targeted content database 138, content rankings are generated for each of the clusters. In some embodiments, a profile corresponds to a user account, a user device, and/or a user profile (e.g., a user watching during a timeslot), etc.

To record the cluster assignments, in some embodiments, global cluster assignments 135 are derived from the full model 134. The global cluster assignments 135 can be stored in a table representing the assignment(s) of each user to one or more of the learned clusters in accordance with some embodiments. In some embodiments, the table representing the global cluster assignments 135 records the probability of a respective user being classified to a respective cluster.

To record the content rankings, for each media content item stored in the targeted content database 138, the server 105 tags or labels the content ranking generated for a cluster. The label (also referred to sometimes hereinafter as the "tag" or the "content tag") is the predicted content ranking of a media content item for each cluster. In some embodiments, the label is stored as part of the content metadata in the targeted content database 138. In some embodiments, the server 105 sends the labels to the end devices (e.g., the weakly connected devices 120 and/or the fully connected devices 110) in the same way as other metadata of the media content, e.g., through a broadcasted data carousel.

In addition to training, maintaining, and/or executing the full model 134, the learning engine 132 also trains, maintains, and/or executing a device model 136 on the server 105 in accordance with some embodiments. Similar to the full model 134, the device model 136 is a cluster classifier in accordance with some embodiments. Different from the full model 134, the device model 136 is simpler and trained based on input features that are available locally in a respective device. To train the device model 136, the learning engine 132 uses the global cluster assignments 135 as the learning target in accordance with some embodiments. As such, the trained device model 136 is based on a simpler set of features and approximates the cluster assignments learned by the full model 134. Such a simpler model can be run locally on a user device, which often has limited resources (CPU, memory, etc.).

In some embodiments, an exemplary weakly connected device 120-1 includes a device user data database 140 for storing user information associated with a user of the weakly connected device 120-1, a device classifier engine 142 for generating device cluster assignments 144 based on inputs from the device user data database 140, and a targeted content selector 146 for selecting targeted content. In some embodiments, the weakly connected device 120-1 receives from the server 105 (e.g., downloading through a data carousel) parameters of the device model 136 and metadata (e.g., the content tags) stored in the targeted content database 138.

In some embodiments, the device user data database 140 stores relevant user actions collected by the weakly connected device 120-1 (e.g., content watched by the user, etc.) and/or user information (e.g., geographical region, user language selection, etc.). The information from the device user data database 140 is used by the device classifier engine 142 to create local features. Based on the local features, the device classifier engine 142 locally executes the device model 136 and predicts the probability that a profile associated with the weakly connected device 120-1 (e.g., a user account, a device profile, a user using the device during a timeslot) belongs to a cluster. In some embodiments, the weakly connected device 120-1 stores the probability in the device cluster assignments 144. Based on the device cluster assignments 144 and/or other business rules, the targeted content selector 146 selects from a set of targeted content and determines what content to show to the user at a given moment in accordance with some embodiments.

As explained above, with limited data, it is difficult for previously existing solutions to predict targeted content. Because users at fully connected (e.g., 2-way connected) devices and users at weakly connected devices typically belong to the same population in terms of behaviors and preferences, when there are sufficient user data collected from the fully connected devices, in accordance with various embodiments described herein, the device model built based on such user data can predict targeted media content for the users at weakly connected devices with sufficient precision. As such, the machine learning based approach described herein achieves approximated personalization of targeted content with improved prediction accuracy.

It should be noted that though FIG. 1 illustrates a single server 105, the system 100 may include one or more servers 105. Likewise, the system 100 may include one or more global user data databases 130 (e.g., distributed), learning engines 132, and/or targeted content databases 138 (e.g., distributed). For the sake of simplicity, the subject matter will be described hereinafter for the most part with reference to a single server 105, a single global user data database 130, a single learning engine 132, and a single targeted content database 138. Thus, references herein to the server 105, the global user data database 130, the learning engine 132, and the targeted content database 138 in the single form cover embodiments where there are a single server 105, global user data database 130, learning engine 132, and targeted content database 138 as well as embodiments where there are multiple servers 105, global user data databases 130, learning engines 132, and targeted content databases 138.

It should also be noted that though FIG. 1 illustrates an exemplary weakly connected device 120-1 as having components such as the device user data database 140, the device classifier engine 142, the device cluster assignments 144, and the targeted content selector, a fully connected device 110 can also have one or more such components. As such, the approximated personalization disclosed herein can be performed on any user device.

For instance, a 2-way connected device often sends its user data and requests from the server 105 a targeted content to present at a given time. In response, the server 105 computes for the 2-way device one or more targeted media content items, e.g., based on the full model 134 and the user data from the 2-way device. However, in consideration of privacy protection, a particular user using a 2-way device may not want to send user actions to the server 105. To accommodate such users, without user data or with limited user data from the particular 2-way device, a device model 136 trained for such a 2-way device can be utilized to select targeted content for the particular user. In another example, to save server resources, the server 105 can send parameters of the device model 136 to a 2-way device so that the 2-way device can run predictions locally for targeted content selection.

In another example, for a 2-way device, the server 105 can calculate the content rankings of the targeted content based on both the full model 134 and the device model 136 in response to a request from the 2-way device. When the differences of content rankings between the prediction from the full model 134 and the device model 136 exceed a threshold, the server 105 sends the delta (e.g., the content rankings predicted from the full model 134 and/or the differences between the content rankings) to the 2-way device. On the other hand, when the differences do not exceed the threshold, the 2-way device uses the local prediction by the device model 136 and the system 100 saves network bandwidth by not sending the list of targeted content from the server 105 to the 2-way device.

Figure 2:
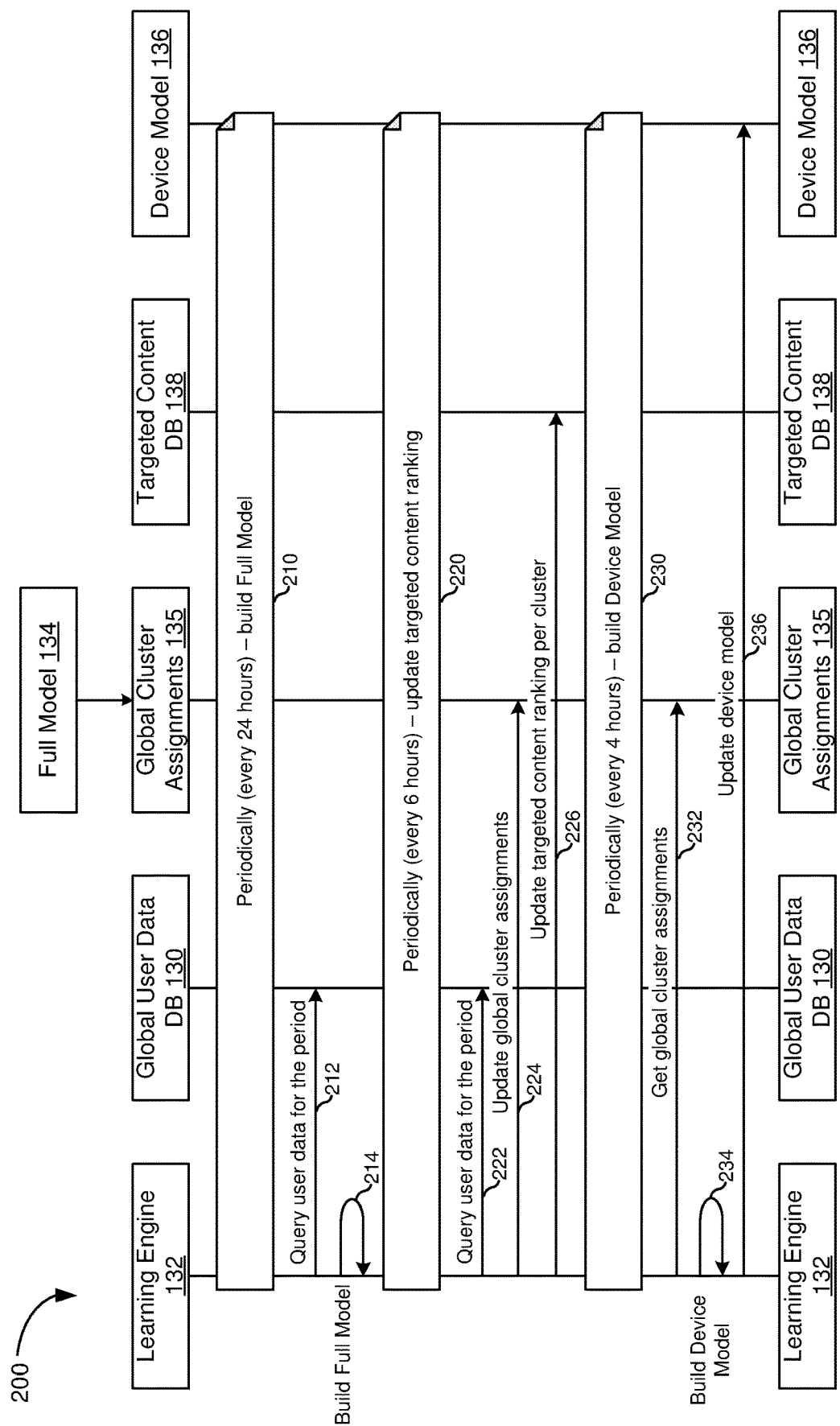
FIG. 2 is a sequence diagram illustrating model building for approximated personalization of targeted content, in accordance with some embodiments.

FIG. 2 is a sequence diagram 200 illustrating model building for approximated personalization of targeted content, in accordance with some embodiments. In some embodiments, the processes illustrated in the sequence diagram 200 are performed at the server 105 (FIG. 1). As represented by step 210, in some embodiments, the server 105 periodically (e.g., every 24 hours) builds the full model 134. In order to build the full model 134, as represented by step 212, the learning engine 132 queries the global user data database 130 for the period, e.g., user data from Monday 10 pm to Tuesday 10 pm. Using the data for the period from fully connected devices, as explained above with reference to FIG. 1, the learning engine 132 learns for each profile, the content the profile is interested in and builds the full model 134 accordingly, as represented by step 214.

In step 214, the full model 134 can be established using various machine learning methods. Further, the training of the full model 134 can be unsupervised or supervised. For unsupervised learning, in some embodiments, the learning engine 134 creates a cluster model as part of the full model 134. The cluster model divides the profiles into clusters. The processing of finding the clustering can use any clustering methods, e.g., K-means or Gaussian Mixture. The features for creating the clusters in the unsupervised learning can be content intrinsic features (e.g., the topic of the content), content latent features (e.g., learned from Collaborative Filtering), and/or a sum of both in accordance with some embodiments.

For instance, a media content item watched by a user until the end is considered an implicit content ranking. Using such content latent features and applying recommendation algorithms such as Collaborative Filtering, clusters are created as part of the full model 134. The server 105 can then use the cluster information to predict content rankings for content that the user has not watched.

In some embodiments, the assignment of a profile to a cluster is probabilistic, representing the probability that a profile belongs to a given cluster. In some embodiments, for unsupervised learning, the number of clusters is determined in advance (e.g., by choosing a number suitable to the simpler device model 136) or based on criteria such as Bayesian Information Criterion. In some embodiments, the assignment to clusters is optimized to minimize the difference between the content ranking assigned to the cluster that the profile belongs to and the content ranking assigned by the user (or the associated profile) for all users and/or profiles and all contents.

For example, using expectation-maximization algorithm, a Gaussian Mixture is built as the full model 134. This approach automatically minimizes the differences between the content rankings of a respective cluster given by users and the content rankings for the cluster. In some embodiments, instead of automatically minimizing the differences, the learning engine 132 first builds an intermediatory model that learns the content rankings for all profiles, e.g., using Collaborative Filtering. The intermediatory model learns to represent each profile as a vector over hidden features or latent parameters of the model in accordance with some embodiments. In some embodiments, the profiles are then clustered in the full model 134 using the vectors through a clustering algorithm. In some embodiments, the clustering algorithm generates a center for each cluster. As such, the content ranking prediction for the cluster is the result given by the intermediatory model to the vector representing the cluster center. This clustering approach allows the learning engine 132 to incorporate more information (e.g., user demographic data, content metadata, etc.) in addition to the content rankings to indirectly optimize the cluster assignments.

For supervised learning, in some embodiments, the clusters are defined in advance. For example, from vacation booking information (e.g., purchased from a data broker), a subset of users that makes frequent vacation bookings are identified. The learning engine 132 then uses the vacation booking data along with other data from the global user data database 130 as the learning target to train the full model 134. The full model 134 then classifies profiles into a frequent vacationer cluster and a less frequent vacationer cluster.

Once the full model 134 is trained, in some embodiments, as represented by step 220, the server 105 (FIG. 1) periodically (e.g., every 6 hours) executes the full model 134 to derive the global cluster assignments 135 and obtains updates to the targeted content rankings stored in the targeted content database 138. In some embodiments, the learning engine 132 first queries the global user data database 130 for user data from the period, as represented by step 222. The learning engine 132 then updates the global cluster assignments 135 based on the outputs from executing the full model 134, as represented by step 224, and updates the targeted content database 138, including updating the targeted content ranking per cluster, as presented by step 226.

In some embodiments, the targeted content ranking per cluster is assigned by a weighted average over all profiles of the content rankings predicted for the content by the full model 134 previously learned. In such embodiments, the weights represent the probability that the profile belongs to the cluster, e.g., as set in the global cluster assignments 135. For example, FIG. 3 is a diagram 300 illustrating exemplary clustering and targeted content tagging in accordance with some embodiments. In FIG. 3, based on user actions, user characteristics, and/or content characteristics, the learning engine 132 builds the full model 134. According to the full model 134, profiles (e.g., user accounts, device profiles, and/or different profiles representing viewing at different time of the day) are assigned to clusters 310 (e.g., cluster 1 310-1, cluster 2 310-2, . . . cluster M 310-M). Further, according to the full model 134, each targeted content 320 (e.g., targeted content 1 320-1, targeted content 2 320-2, . . . targeted content N 320-N) is tagged with a content ranking for each of the clusters 310. The content ranking indicates the likelihood of providing a respective targeted content to the profiles assigned to a respective cluster 310.

In FIG. 3, for targeted content N 320-N, the full model 134 previously learned content ranking values of $r_1$ for profile 1, $r_2$ for profile 2, $r_3$ for profile 3, . . . $r_K$ for profile K, etc. According to the global cluster assignments, the probabilities that profiles 1 . . . K belong to cluster M 310-M are $p_1$ for profile 1, $p_2$ for profile 2, $p_3$ for profile 3, . . . $p_K$ for profile K respectively. Using the previously learned content ranking values and the probabilities of the users being assigned to a respective cluster, targeted content N 320-N is tagged with a weighted average over profiles 1 . . . K of the content rankings 1 . . . K, e.g., storing the ranking value of $(p_1*r_1+p_2*r_2+p_3*r_3+ \ldots +p_K*r_K)/(p_1+p_2+p_3+ \ldots +p_K)$ in the targeted content database 138 for targeted content N 320-N.

Referring back to FIG. 2, in some embodiments, as explained above with reference to FIG. 1, the content tags (including the content rankings) are sent to the end user devices in the same way as other metadata associated with the content, e.g., through a broadcasted data carousel. In some embodiments, to avoid storing and transmitting low-ranking targeted content to clusters, a threshold is set. Accordingly, the label for a particular cluster is presented to the user device if the content ranking is above the threshold value.

For example, continuing the vacationer classification example above, by executing the full model 134, profiles that are assigned to the frequent vacationer cluster are similar to the subset of users who made frequent vacation bookings. Thus, media content items related to travel destinations and/or vacation advertisements are tagged with high rankings for the frequent vacationer cluster in the targeted content database 138. With the content ranking values above the threshold, the media content items related to travel destinations and/or vacation advertisements are sent to the profiles assigned to the frequent vacationer cluster. Other media content items that have content rankings below the threshold may not be stored, presented to the user device, and/or transmitted to the user device to save system resources.

Still referring to FIG. 2, as represented by step 230, the server periodically (e.g., every 4 hours) builds the device model 136. When training the device model 136, the learning engine 132 obtains cluster assignments from the global cluster assignments 135, as represented by step 232. The learning engine 132 then uses the global cluster assignments as the learning target to build the device model 136, as represented by step 234. Accordingly, the device model 136 is based on a simpler set of features and approximates the cluster assignments learned by the full model 134. Because of its simplicity, the device model 136 can be run locally on user devices that often have limited resources. As represented by step 236, having built the device model 136, the learning engine updates the device model 136, including periodically sending parameters of the device model 136 to the weakly connected devices (e.g., through a broadcasted data carousel). For example, in the case of the device model 136 being a simple Naïve Bayes model and the features available on a weakly connected device being genres watched by a user (e.g., each genre as a percentage of the total watched), the parameters can be the likelihood that the user belongs to a given cluster, conditional to the percentage watched, for each genre.

It should be noted that for memory optimization, when the user device receives the parameters of the device model 136, the user device stores the parameters in RAM in accordance with some embodiments. On the other hand, inputs to the device model 136, e.g., user actions and/or features derived from the user data, are stored in persistent memory on the user device for a period of time. For example, a reasonably accurate prediction of targeted content may require at least one week of user data. As such, the user device stores at least one week of user data in its persistent storage, while storing the parameters of the device model 136 in RAM.

In some embodiments, the device model 136 is limited to a set of pre-defined parameters relevant to a particular user profile, user account, and/or user device. As such, the device model 136 is simple enough to run on the user device and at the same time can predict targeted content with reasonable precision. For example, when targeting users who showed strong interest in a specific genre of media content, e.g., watching such travel content more than average, a set of parameters for features related to traveling activities is set when training the device model 136.

Figures 4A, 4B:
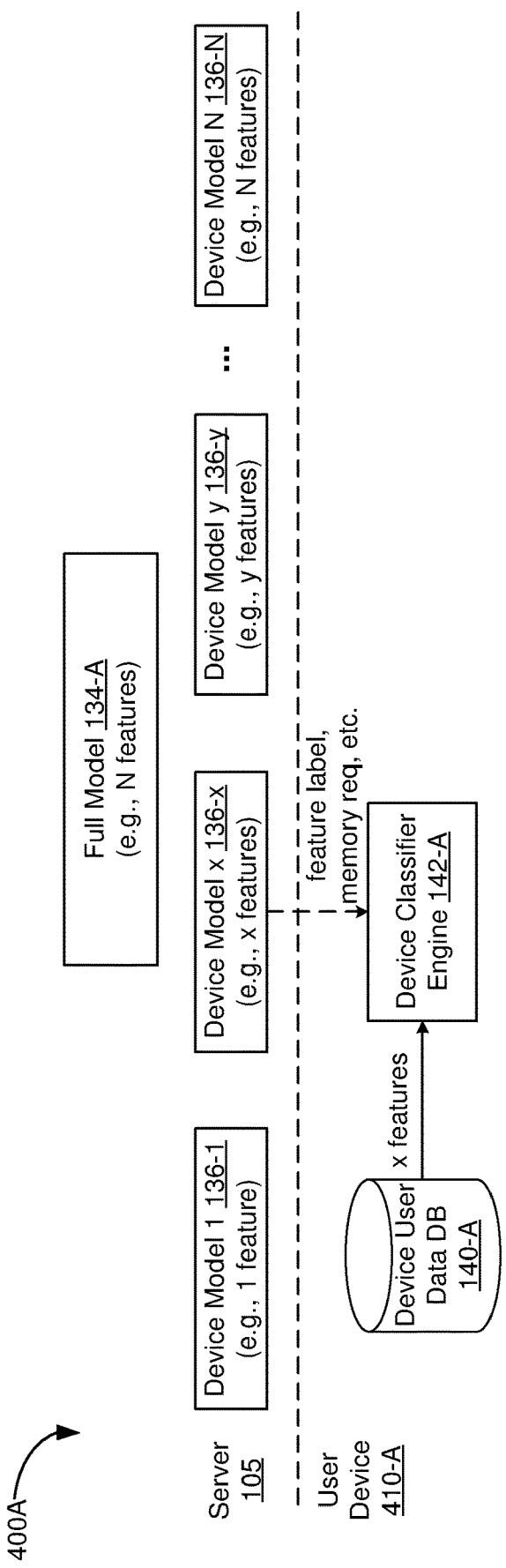
FIGS. 4A and 4B are diagrams illustrating exemplary device model building, in accordance with some embodiments.

FIGS. 4A and 4B are diagrams 400A and 400B illustrating exemplary device model building for approximated personalization of targeted content in accordance with various embodiments. Many 1-way devices have restricted resources, in particular, persistent memory such as NVRAM. Moreover, the types of user devices for the same operator that are connected to the same headend may vary. Therefore, it is important to allow the device model to adapt to different memory profiles, especially when the user device has less memory over time.

In some embodiments, for memory optimization, the server (e.g., the server 105) creates different device models. Further, in some embodiments, the server orders local features on user devices according to their explanatory power. For example, in FIG. 4A, the server 105 creates the full model 134-A that has N features. Based on data analysis (e.g., principal component analysis), the N features are ranked according to their explanatory power. For instance, the server 105 creates device model 1 136-1 that has 1 feature (e.g., the most explanatory feature), device model x 136-x that has x features (e.g., the x most explanatory features), device model y 136-y that has y features (e.g., the y most explanatory features), . . . device model N 136-N that has N features (e.g., N features).

In some embodiments, the server 105 transmits parameters for the device models 136 in a data carousel to a user device 410-A (e.g., one of the fully connected devices 110 or weakly connected devices 120, FIG. 1). When transmitting the parameters, the server 105 tags the number of features and/or memory requirements in accordance with some embodiments. Based on the tags and the device characteristics, the user device 410-A selects the device model that fits its memory profile. In the example shown in FIG. 4A, the user device 410-A selects device model x 136-x, which has x features and fits the characteristics of the user device 410-A. The device classifier engine 142-A on the user device 410 then obtains x local features from the device data database 140-A and executes device model x 136-*x* to predict device cluster assignments.

In some embodiments, when multiple device models are trained, the user device 410-A selects a particular device model based on not only the device characteristics but also other factors, such as time of the day. For example, one can divide a day into different timeslots, e.g., early morning [3:00-9:00], morning-afternoon [9:00-14:00], afternoon [14:00-18:00], and evening [18:00-02:00]. In some embodiments, each timeslot is considered to be a different user and/or a different user profile. Different device models 136 are trained for different timeslots, e.g., device model 1 136-1 for early morning, device model x 136-*x* for morning-afternoon, device model y 136-*y* for afternoon, and device model N 136-N for evening. As such, one device model, e.g., device model y 136-*y*, can be used in the afternoon (e.g., by kids after getting off from school), and a different device model, e.g., device model N 136-N, can be used in the evening (e.g., by adults after getting off from work).

In some embodiments, instead of training multiple device models, the server 105 creates a single device model. For example, in FIG. 4B, the server 105 creates one device model 136-M that has M features. In some embodiments, for memory optimization, the server 105 transmits parameters of the device model 136-M to a user device 410-B with rankings of the M features (e.g., according to explanatory power), such as ranking feature 1, feature 2, . . . feature x, . . . feature M from the highest to lowest. Also in such embodiments, the server 105 transmits default values for the features. In some embodiments, the default values are based on averages over the population.

In some embodiments, for memory optimization, based on characteristics of the user device 410-B (e.g., memory profile) and the feature rankings, the user device 410-B decides the number of features to be store locally in the device user data database 140-B. In such embodiments, the user device 410-B selects features that have feature ranking values above a threshold, e.g., storing feature 1, feature 2, . . . feature x. When executing the device model 136-M, the device classifier engine 142-B uses features 1 . . . x in combination with the default values for the remaining M-x features as inputs.

In some embodiments, when a single device model is trained, e.g., the device model 136-M, the user device 410-B stores behavioral data separately for providing different features to the single device model. For example, in the timeslot division example described above with reference to FIG. 4A, using the system in FIG. 4B, the user device 410-B stores behavioral data separately for each timeslot. As such, each timeslot corresponds to a different profile on the user device 410-B. The user device 410-B can then apply the single device model to the user data collected in the current timeslot for classifying the device cluster assignment. As such, the classification automatically adapts to different types of viewers in front of the TV and/or different user profiles.

As shown in FIGS. 4A and 4B, the machine learning based media content targeting method described herein can be used on any user devices for improved prediction accuracy. Using the embodiments shown in FIG. 4A, when the user device 410-A has more resources (e.g., memory upgrade), the user device 410-A can switch to a device model that uses more features as inputs than device model x 136-*x*, such as device model y 136-*y* or device model N 136-N for improved prediction accuracy. Conversely, when the user device 410-A has less resources (e.g., due to memory degradation or user installing more applications), the user device 410-A can switch to a device model that uses fewer features as inputs than device model x 136-*x*, such as device model 1 136-1, where using device model 1 136-1 accommodates the device profile of the user device 410-A and at the same time ensures reasonable content prediction accuracy. Likewise, using the embodiments shown in FIG. 4B, the user device 410-B can store more local features and use fewer default values for improved prediction accuracy when the user device 410-B has more resources, or store fewer local features and use more default values to balance memory utilization and prediction accuracy.

Figure 5:
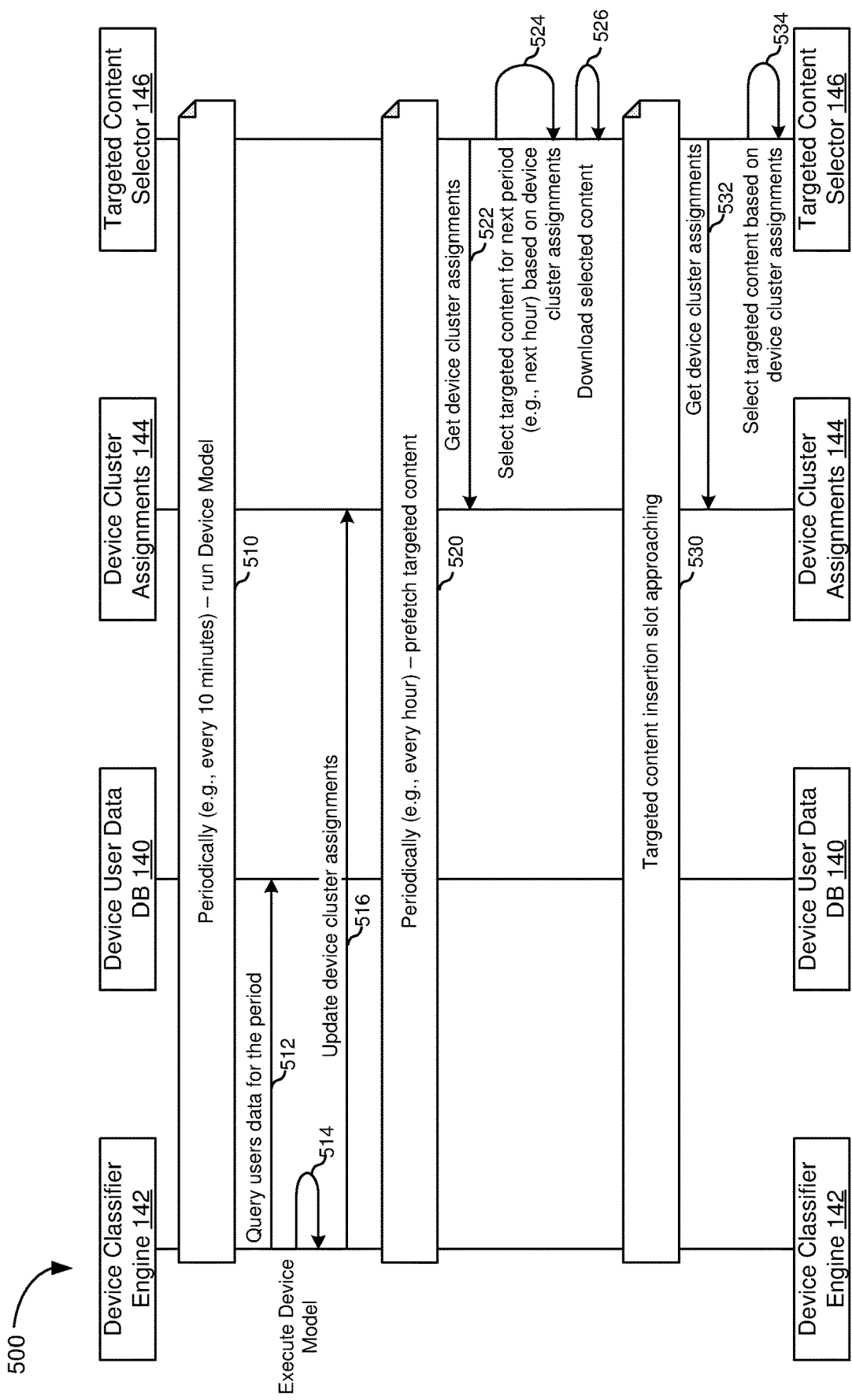
FIG. 5 is a sequence diagram illustrating targeted content selection for approximated personalization of targeted content, in accordance with some embodiments.

FIG. 5 is a sequence diagram 500 illustrating targeted content selection for approximated personalization, in accordance with some embodiments. In some embodiments, the processes illustrated in the sequence diagram 500 are performed at a user device, e.g., the fully connected device 110 or the weakly connected device 120 (FIG. 1).

In some embodiments, the user device accumulates locally available features, which are the same types of features used to create the device model at the server. As represented by step 510, for cluster classification, the user device periodically (e.g., every 10 minutes) runs the device model by querying, as represented by step 512, the device user data database 140 for the user data within the period (e.g., within a 10-minute window). Alternatively, the cluster classification can be based on the user actions collected on the last [n] minutes in accordance with some embodiments. In such embodiments, the classification automatically follows the current behavior on the user device (e.g., a sliding window).

As represented by step 514, the device classifier engine 142 executes the device model. Using locally available features, the device classifier engine 142 applies device model parameters obtained from the server to predict to which cluster a profile belongs in accordance with some embodiments. In some embodiments, the prediction is a probabilistic prediction, i.e., the chance that a profile associated with the user device belongs to a cluster. In some embodiments, as represented by step 516, the output of the prediction is stored as the device cluster assignments 144, e.g., by updating a table representing the probabilities of profiles belonging to clusters.

In some embodiments, the user device predicts in advance which targeted content (e.g., ads) is the most suitable for the next time period (i.e., 1 hour to 2 hours from now). This allows the device to periodically (e.g., every 1 to 2 hours) pre-fetch the targeted content and store them in the local device memory, as represented by step 520. To pre-fetch the targeted content, as represented by step 522, the targeted content selector 146 obtains the device cluster assignments 144. As represented by step 524, the targeted content selector 146 selects the targeted content for the next period (e.g., the next hour) based on the device cluster assignments and the content tags of the targeted content received from the server. As represented by step 526, the targeted content selector 146 then downloads the selected targeted content, e.g., from the targeted content database 138 on the server 105 (FIG. 1). When it is time to select personalized content (e.g., approaching an advertisement insertion slot), as represented by step 530, the target content selector 146 obtains device cluster assignments 144, as represented by step 532. The target content selector 146 then looks, in the set of available targeted content, for the content that has the highest content ranking for the cluster that the profile is assigned to, as represented by step 534. Exemplary cluster assignments and content selection are shown in FIGS. 8A and 8B and described in further detail below with reference to FIGS. 8A and 8B.

Pre-fetching as illustrated in steps 520-526 saves network bandwidth. Particularly, when the targeted content is transmitted using a data carousel, pre-fetching reduces the carousel bandwidth. For example, when the targeted content is known shortly before it is scheduled to be inserted, making it available in a short timeframe implies a high cycle rate of the data carousel. In contrast, when the targeted content is known in advance, e.g., 1 or 2 hours in advance, making such content appear once per hour in the data carousel saves network bandwidth. Other resource saving and optimization techniques are described below with reference to FIGS. 6 and 7.

Figure 6:
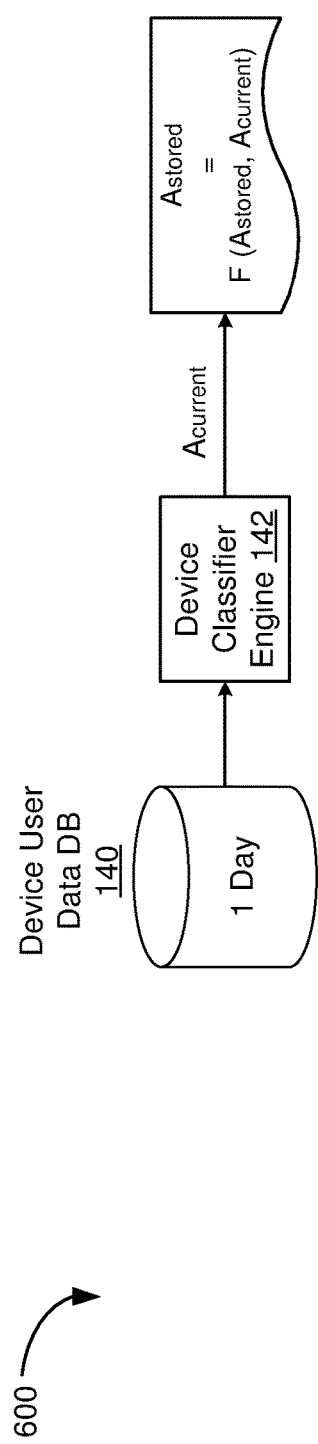
FIG. 6 is a block diagram illustrating an exemplary memory saving mechanism on a user device for approximated personalization of targeted content, in accordance with some embodiments.

FIG. 6 is a block diagram 600 illustrating a memory saving mechanism on a user device for approximated personalization of targeted content in accordance with some embodiments. In some embodiments, to save storage, a user device calculates the assigned clusters periodically (e.g., on daily basis) using user features within the period and revises the calculation result based on the last calculation result that was stored in the persistent memory.

For example, in its persistent memory, the user device stores the probability of assigning a profile to a cluster calculated previously as $A_{stored}=0.6$. The user device then calculates the probability of assigning the profile to the cluster based on the features from the last 24 hours as $A_{current}=0.7$. The user device further revises the cluster assignment value stored in the persistent memory by calculating the weighted average of $A_{current}$ and $A_{stored}$, e.g., $A_{stored}=(A_{current}*\alpha+A_{stored}*\beta)/(\alpha+\beta)$, where $\alpha$ and $\beta$ are weights. For instance, when $\alpha=1.0$ and $\beta=0.9$, the revised cluster assignment value stored in the persistent memory is $(0.7*1.0+0.9*0.6)/(1.0+0.9)=0.653$. The stored cluster assignment can then be used as an input for calculating the cluster assignment for the next day. Because the cluster assignment uses historical values, the user device can persistently store fewer user features, e.g., 1 day of local user data and/or features, thus reducing the amount of storage on the user device for storing local features while maintaining sufficient prediction accuracy.

Figure 7:
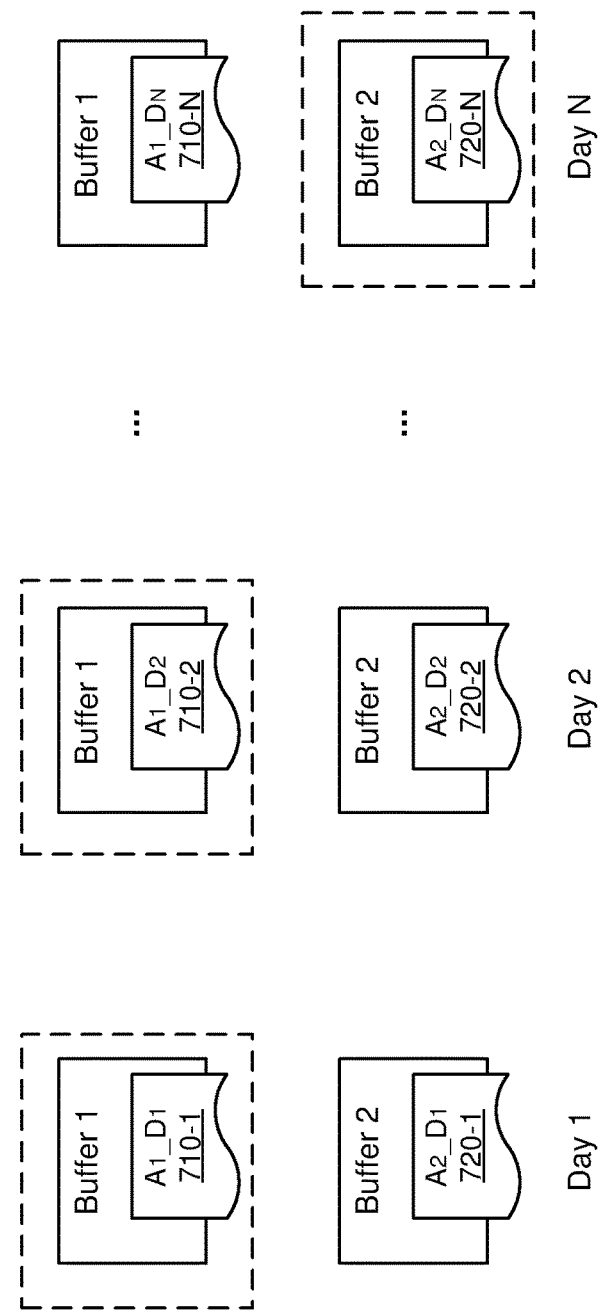
FIG. 7 is a block diagram illustrating an exemplary memory optimization mechanism on a user device for approximated personalization of targeted content, in accordance with some embodiments.

FIG. 7 is a block diagram 700 illustrating a cluster assignment mechanism on a user device for resource optimization in accordance with some embodiments. In some embodiments, the user device uses a double buffer, e.g., buffer 1 and buffer 2 in FIG. 7, for memory optimization. The cluster assignments can change from time to time (e.g., when a model is learned and/or updated). When the clusters change, the stored device cluster assignments become invalid. Using the double buffer, in some embodiments, the user device assigns a profile to the old and the new clusters in parallel and stores them in two different buffers. The old clusters are updated and used for approximated personalization while features are accumulating during a current period. When enough data are accumulated (e.g., 7 days), the user device switches the buffers and starts to use the new clusters for approximated personalization.

For example, in FIG. 7, the user device previously stores the older clusters in buffer 1 as $A_1\_D_1$ 710-1, where the notation $A_1\_D_1$ representing cluster assignments stored in buffer 1 on day 1. Upon receiving new device model parameters, the user device starts to compute device cluster assignments using the new device model parameters and based on the daily user actions. The user device then stores the new clusters in buffer 2 as $A_2\_D_1$ 720-1, where the notation $A_2\_D_1$ representing assignments stored in buffer 2 on day 1. On day 1, the user device still uses the old cluster assignments $A_1\_D_1$ 710-1, as indicated by the rectangle with dashed line as borders.

In some embodiments, the user device revises the old clusters stored in buffer 1 and the new clusters stored in buffer 2 using the techniques explained above with reference to FIG. 6, e.g., revising the old cluster assignments in buffer 1 as a weighted average of the current cluster assignment values and previously stored old clusters in buffer 1. Because there were no previously stored clusters in buffer 2, on day 1, the revised new clusters in buffer 2 remain the same.

On day 2, the assignment is not yet reliable enough because not enough user action data have been accumulated, e.g., less than 7 days. The stored cluster assignments $A_1\_D_2$ 710-2 in buffer 1 are still used for targeted content selection, as indicated by the rectangle with dashed lines as borders. In some embodiments, the user device applies the same cluster assignment revision process as in day 1, e.g., calculating $A_1\_D_2$ 710-2 as a weighted average of the current cluster assignment values and $A_1\_D_1$ 710-1. In some embodiments, the user device also applies the cluster assignment revision process in buffer 2, e.g., calculating $A_2\_D_1$ 720-1 as a weighted average of the current cluster assignment values and $A_2\_D_1$ 720-1.

The same process repeats until day N. After N days (e.g., 7 days), the user device has accumulated enough user data, and the user device switches to the new clusters stored in buffer 2, e.g., the new clusters $A_2\ D_N$ 720-N. In some embodiments, the server starts using the new clusters in the sent labels, and non-overlapping cluster indices are used when switching from one cluster scheme to another to avoid ambiguity at switch time.

By allowing less local user data and/or features on the user device in persistent memory, e.g., 1 day of user data, the double buffer described herein optimizes memory usage on the user device. Further, using the double buffer ensures prediction accuracy for approximated personalization. In particular, the new clusters are updated or calibrated for a period of time before being used for prediction. During the calibration period, incorporating new cluster assignment values into historical values ensures prediction precision.

Figure 8C:
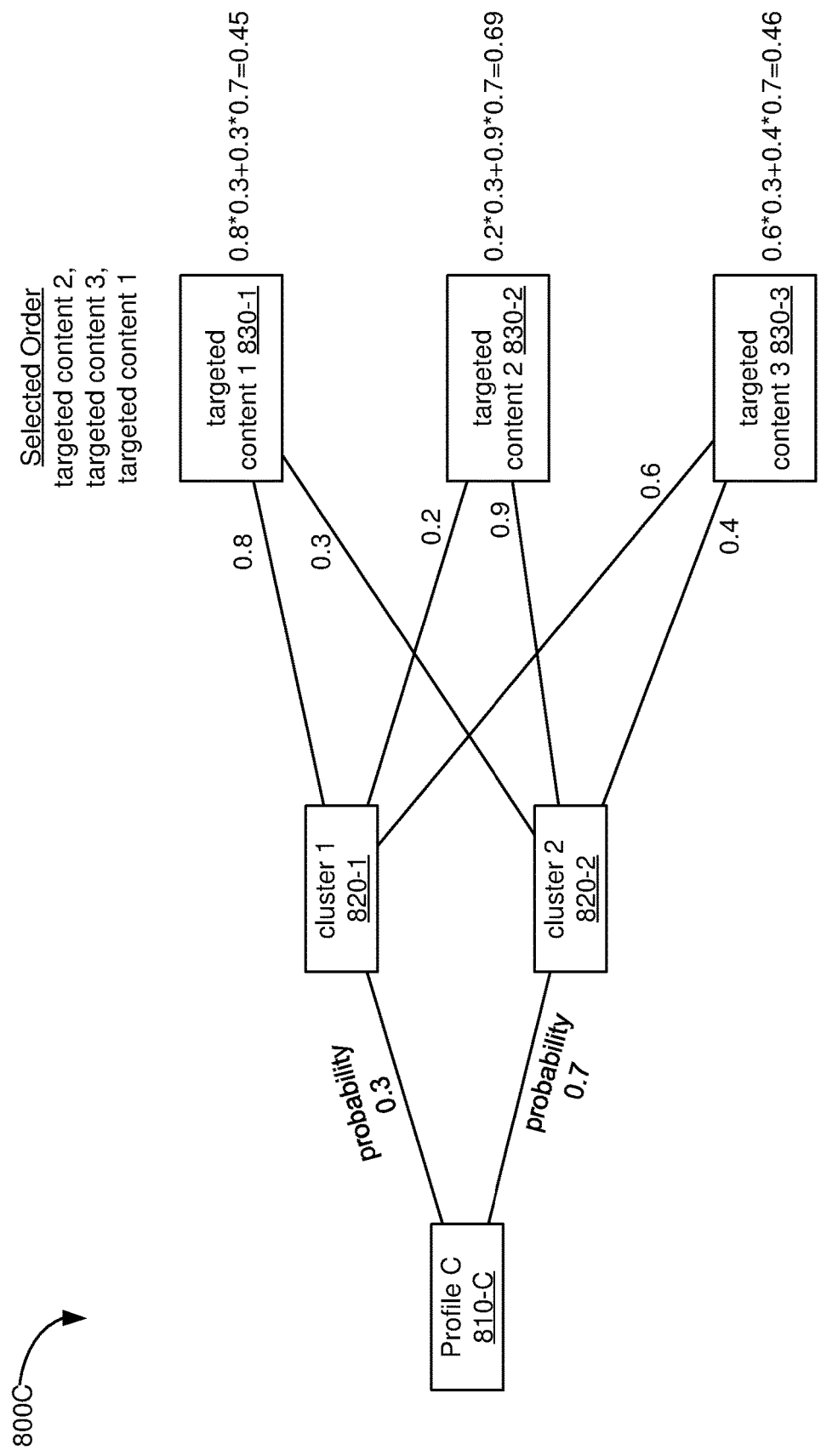

FIGS. 8A-8C are block diagrams 800A-C illustrating exemplary cluster assignments and content selection, in accordance with some embodiments. In some embodiments, the user device assigns a profile to one or more clusters according to the methods described above with reference to FIG. 5. In FIGS. 8A-8C, there are two exemplary clusters 820-1 and 820-2 (collectively referred to hereinafter as the clusters 820) and three exemplary targeted content items, e.g., targeted content 1 830-1, targeted content 2 830-2, and targeted content 3 830-3 (collectively referred to hereinafter as the targeted content items 830). The targeted content items 830 (e.g., stored in the target content database 138, FIG. 1) are labeled or tagged with the content rankings for each of the clusters 820. The content rankings indicate the likelihood of a respective targeted content item 830 being selected for profiles assigned to a respective cluster 820.

For example, targeted content 1 830-1 is tagged 0.8 for cluster 1 820-1 and 0.3 for cluster 2 820-2; targeted content 2 830-2 is tagged 0.2 for cluster 1 820-1 and 0.9 for cluster 2 820-2; and targeted content 3 830-3 is tagged 0.6 for cluster 1 820-1 and 0.4 for cluster 2 820-2. When the device model classifies profile A 810-A to cluster 1 820-1 with probability 1.0, as shown in FIG. 8A, the targeted content selector 146 (FIG. 1) selects the targeted content items 830 in the order of targeted content 1 830-1 (tagged 0.8), targeted content 3 830-3 (tagged 0.6), and targeted content 2 830-2 (tagged 0.2) based on the content ranking values of 0.8, 0.6, and 0.2 from the highest to the lowest. On the other hand, when the device model classifies profile B 810-B to cluster 2 820-2 with probability 1.0, as shown in FIG. 8B, the targeted content selector 146 (FIG. 1) selects the targeted content items 830 in the order of targeted content 2 830-2 (tagged 0.9), targeted content 3 830-3 (tagged 0.4), and targeted content 1 830-1 (tagged 0.3) based on the content ranking values of 0.9, 0.4, and 0.4 from the highest to the lowest.

Although FIGS. 8A and 8B illustrate classifying a respective profile to one cluster with the probability of 1.0, the device model can classify one profile to a set of clusters. As such, in the device cluster assignments, one profile can have various probabilities of being assigned to different clusters. In such embodiments, the targeted content is selected that maximizes the expected value of the sum of the rankings over the set of clusters. For example, in FIG. 8C, profile C 810-C is classified into a set of clusters, e.g., cluster 1 820-1 and cluster 2 820-2. The probability to cluster 1 820-1 is 0.6 and the probability to cluster 2 820-2 is 0.4. In such embodiments, the targeted content selector 146 (FIG. 1) multiplies the rankings from the content tags for a given cluster by the probability that profile C 810-C belongs to a respective cluster and sums over cluster 1 820-1 and cluster 2 820-2. In FIG. 8C, the sum for targeted content 1 830-1 is 0.3, for targeted content 2 830-2 is 0.7. The sum of the product of the cluster assignment and the content tag is 0.45 for targeted content 1 830-1, 0.69 for targeted content 2 830-2, and 0.46 for targeted content 3 830-3. As such, for approximated personalization, the targeted content items 830 are selected for profile C 810-C in the order of targeted content 2 830-2, targeted content 830-3, and targeted content 830-1.

Figure 9A:
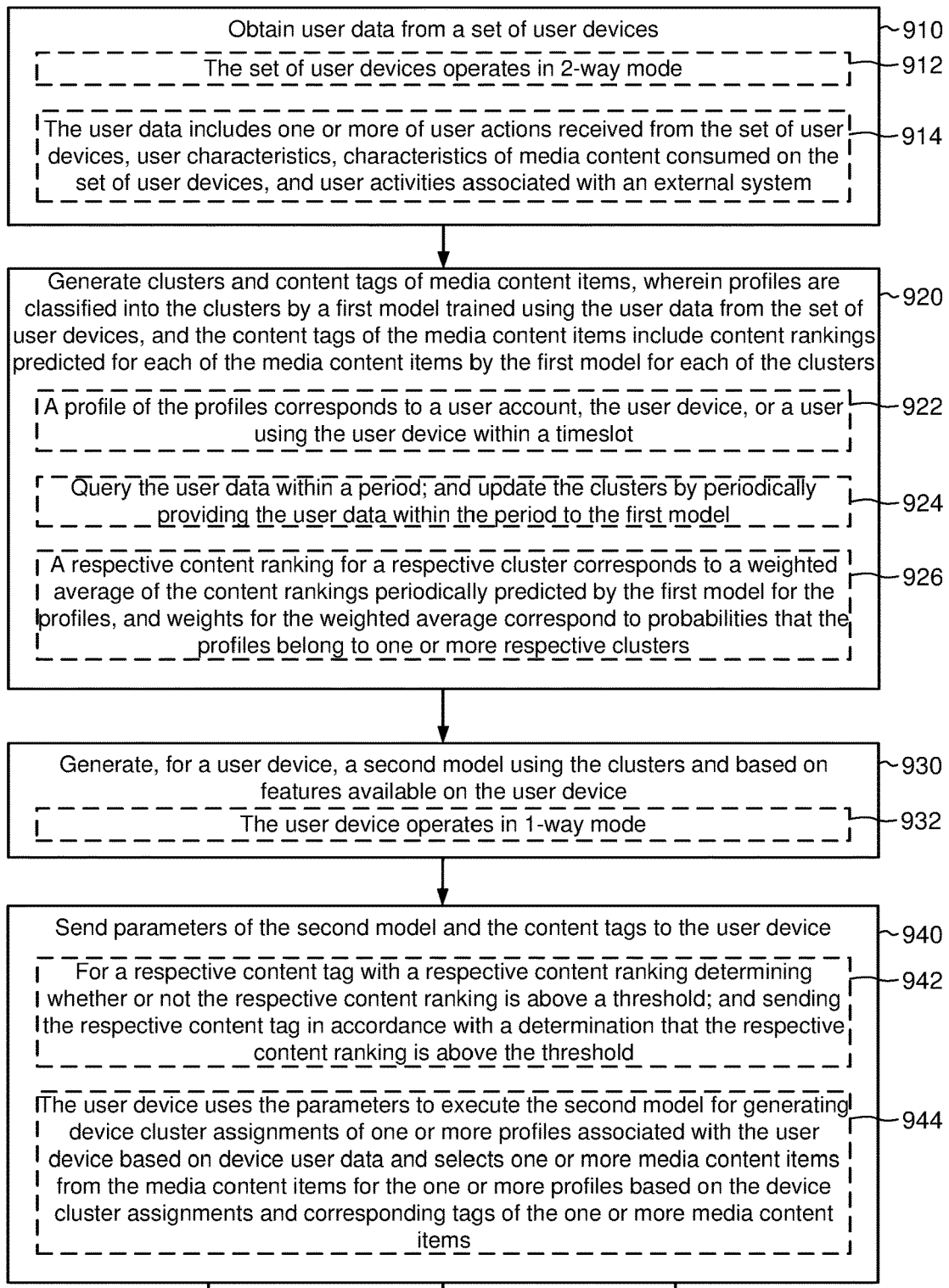

FIGS. 9A and 9B are flowcharts 900A and 900B illustrating model building in preparation for approximated personalization of targeted content in accordance with some embodiments. In some embodiments, the training is performed at a server, e.g., the server 105 (FIG. 1), which includes one or more processors and a non-transitory memory. Briefly, the model building method includes obtaining user data from a set of user devices; generating clusters and content tags of media content items, wherein profiles are classified into the clusters by a first model trained using the user data from the set of user devices, and the content tags of the media content items include content rankings predicted for each of the media content items by the first model for each of the clusters; generating, for a user device, a second model using the clusters and based on features available on the user device; and sending parameters of the second model and the content tags to the user device.

To that end, as represented by block 910, the model building method starts with the server obtaining user data from a set of user devices, e.g., by periodically querying the global user data database 130 as shown in FIG. 2 step 212. In some embodiments, as represented by block 912, the set of user devices operates in 2-way mode. In some embodiments, as represented by block 914, the user data includes one or more of user actions received from the set of user devices, user characteristics, characteristics of media content consumed on the set of user devices, and user activities from an external system.

For example, in FIG. 1, the global user data database 130 stores user data obtained from the fully connected devices 110 that operate in 2-way mode. When operating in 2-way mode, in one direction, each of the fully connected devices 110 receives data, e.g., media content items and/or metadata, etc., from the server 105; and in the other direction, each of the fully connected devices 110 sends to the server 105 user actions (e.g., content selection, content ranking, skipping or watching until the end without skipping, etc.), user characteristics (e.g., user demographic and/or geographic data, etc.), and/or characteristics of media content consumed (e.g., advertisement topic, genre, etc.). In some embodiments, user activities (e.g., vacation booking) from an external system, e.g., a vacation booking system, are also obtained and stored in the global user data database 130.

The model building method continues, as represented by block 920, with the server generating clusters and content tags of media content items. In some embodiments, the server (e.g., the learning engine 132, FIG. 1) trains a first model (e.g., the full model, FIG. 1) that classifies profiles into the clusters. In some embodiments, the server trains the first model using the user data from the set of user devices (e.g., the fully connected devices 110, FIG. 1). In some embodiments, the content tags of the media content items include content rankings predicted for each of the media content items by the first model for each of the clusters. For example, in FIG. 3, the learning engine 132 trains the full model 134 using the data stored in the global user data database 130. Once trained, profiles are classified into the clusters 310. Further as shown in FIG. 3, content tags are derived from the full model 134 so that each of the targeted content 320 is labeled. In another example, in FIGS. 8A-8C, the content tags represent the content rankings predicted for each of the media content items for each of the clusters, e.g., predicting for targeted content 1 830-1, a content ranking value of 0.8 for cluster 1 820-1 and a content ranking value of 0.3 for cluster 2 820-2 respectively.

In some embodiments, as represented by block 922, a profile of the profiles corresponds to a user account, the user device, or a user using the user device within a timeslot. In some embodiments, as represented by block 924, generating the clusters includes querying the user data within a period and updating the clusters by periodically providing the user data within the period to the first model. For example, in FIG. 2 step 210, the server periodically (e.g., every 24 hours) builds the full model 134 by querying the user data for the period in step 212 and periodically providing the user data within the period to the full model 134 in step 214.

In some embodiments, as represented by block 926, a respective content ranking of the content rankings corresponds to a weighted average of the content rankings periodically predicted by the first model for the profiles, and weights for the weighted average correspond to probabilities that the profiles belong to one or more respective clusters. For example, in FIG. 3, K profiles are classified to cluster M 310-M. The server assigns targeted content 1 320-1 a content ranking for targeted content 1 320-1 by calculating a weighted average over K profiles of the content rankings predicted for targeted content 1 320-1, e.g., $\Sigma_{i=1}^{K} p_i * r_i / \Sigma_{i=1}^{K} p_i$, where the weight $p_i$ is the probability that a respective profile belongs to a respective cluster, and $r_i$ is the content ranking of targeted content 1 320-1 predicted by the full model 134 for the respective profile.

Still referred to FIG. 9A, as represented by block 930, the model building method continues with the server generating, for a user device, a second model using the clusters and based on features available on the user device. In some embodiments, as represented by block 932, the user device operates in 1-way mode, e.g., a weakly connected device 120 in FIG. 1. For example, in FIG. 2 step 230, the server periodically (e.g., every 4 hours) builds a second model, e.g., the device model 136. As shown in FIGS. 1 and 2, when building the device model 136, the server uses the global cluster assignments 135 as the learning target. As such, relative to the full model 134, which is trained based on the global user data database 130, the device model 136 is based on a simpler set of features and a simpler algorithm and approximates the cluster assignments learned by the full model 134. Accordingly, the simpler device model 136 can be run locally on user devices with limited resources (e.g., CPU, memory, bandwidth, etc.), such as many 1-way devices.

As represented by block 940, the model building method continues with the server sending parameters of the second model and the content tags to the user device. In some embodiments, as represented by block 942, sending the parameters of the second model and the content tags to the user device includes, for a respective content tag with a respective content ranking, determining whether or not the respective content ranking is above a threshold and sending the respective tag in accordance with a determination that the respective content ranking is above the threshold. In other words, a threshold can be set so that the label for a cluster is presented to a user device when the content ranking is above the threshold value. Accordingly, low ranking content tags are not stored, presented, and/or transmitted to save storage and/or bandwidth.

In some embodiments, as represented by block 944, the user device uses the parameters to execute the second model for generating device cluster assignments (e.g., the device cluster assignments 144, FIG. 1) of one or more profiles associated with the user device based on device user data (e.g., stored in the device user data database 140, FIG. 1) and selects (e.g., by the targeted content selector 146, FIG. 1) one or more media content items from the media content items for the one or more profiles based on the device cluster assignments and corresponding content tags of the one or more media content items.

Referring to FIG. 9B, in some embodiments, as represented by block 950, the model building method further includes training multiple models for the user device, each of the multiple models has a subset of the features. In such embodiments, sending the parameters of the second model includes sending one or more of characteristics of the subset of the features and suitable device types to the user device in accordance with some embodiments. Accordingly, the user device selects the second model from the multiple models based on characteristics of the user device and the one or more of the characteristics of the subset of the features and the suitable device types.

For example, in FIG. 4A, the server 105 creates multiple device models 136 for the user device 410-A, each with a different number of features. In the case of creating a full model 134-A with 10 features, the server 105 creates device model 1 136-1 with one feature (e.g., the most explanatory feature), device model x 136-x with two features (e.g., the two most explanatory features), etc. In some embodiments, the server 105 transmits parameters of the multiple device models 136 in a data carousel, where the parameters include the number of features and the memory requirements. The user device 410-A can then select the most suitable device model based on the number of features and/or the memory requirements, e.g., the one that fits its memory profile and/or meets prediction accuracy criteria. Alternatively, each device model can be tagged by the server for the device types it is suitable for, and the user device can select the device model tagged for its device type.

Still referring to FIG. 9B, in some embodiments, as represented by block 960, the model building method further includes sending metadata indicating rankings of the features for the second model and default values of the features. In such embodiments, the user device executes the second model using a subset of the features and a subset of the default values in accordance with some embodiments. For example, in FIG. 4B, the server 105 trains a single device model 136-M for the user device 410-B. In such embodiments, the server 105 transmits the rankings of the features (e.g., according to explanatory power) and default values of the features (e.g., based for example on average over all the population). Further in such embodiments, the user device 410B decides, based on its memory profile, the number of user features to be stored in its persistent memory (e.g., ordered by the explanatory power) and puts default values for the rest.

In some embodiments, as represented by block 970, the model building method further includes executing the first model to predict for the user device a first list of media content items and executing the second model to predict for the user device a second list of media content items. The model building method also includes determining whether or not differences between the first list of media content items and the second list of media content items exceed a threshold. The model building method additionally includes sending the first list of media content items in accordance with a determination that the differences exceed the threshold.

For example, as explained above with reference to FIG. 1, for a fully connected device 110 (e.g., a 2-way device), the server 105 calculates the content rankings of the targeted content based on both the full model 134 and the device model 136. In some embodiments, the server sends the 2-way device a correction (e.g., the list of targeted content and/or updated parameters of the device model) when there is a significant difference (e.g., the number of different content rankings in both lists exceeds a threshold number) between the content rankings calculated according to the full model 134 and the device model 136. When the difference does not exceed the threshold, the server 105 does not send the list of content, and the 2-way device executes the device model 136 locally to obtain the list of the content. Thus, the system saves network bandwidth by only sending the delta to the 2-way device and the server saves processing resources by having the user device execute the device model locally for approximated personalization.

Figure 10A:
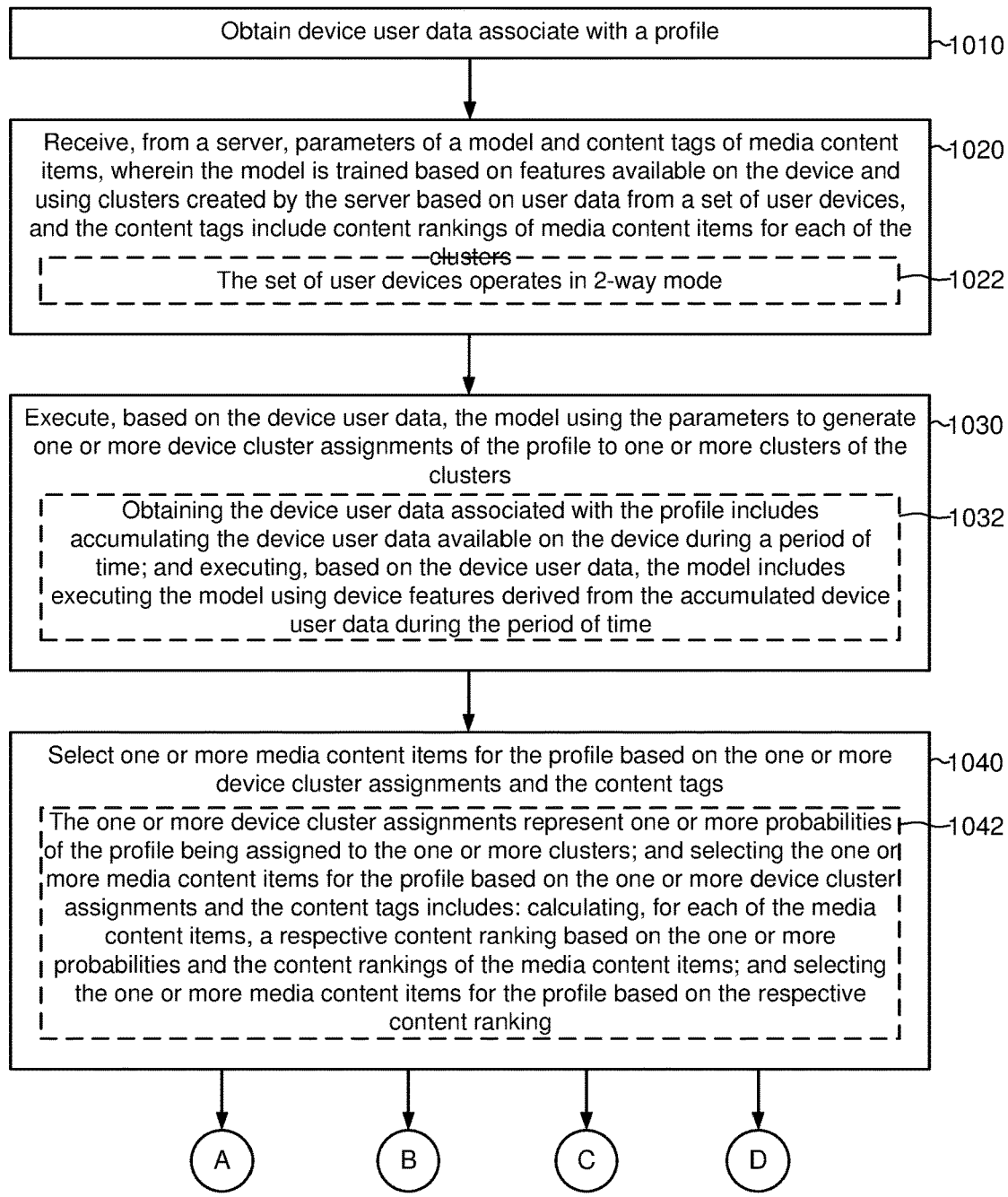

FIGS. 10A and 10B are flowcharts 1000A and 1000B illustrating a media content selection method for approximated personalization in accordance with some embodiments. In some embodiments, the content selection method is performed at a user device, e.g., the fully connected device 110 (FIG. 1) and/or the weakly connected device 120 (FIG. 1), which includes a processor and a non-transitory memory. Briefly, the content selection method includes obtaining device user data associated with a profile; receiving, from a server, parameters of a model and content tags of media content items, wherein the model is trained based on features available on the device and using clusters created by the server based on user data from a set of user devices, and the content tags include content rankings of media content items for each of the clusters; executing, based on the device user data, the model using the parameters to generate one or more device cluster assignments of the profile to one or more clusters of the clusters; and selecting one or more media content items for the profile based on the one or more device cluster assignments and the content tags.

To that end, as represented by block 1010 in FIG. 10A, the content selection method includes obtaining device user data (e.g., stored in the device user data database 140, FIG. 1) associated with a profile (e.g., a user account, a device profile, a user profile representing a timeslot, etc.). As represented by block 1020, the content selection method includes receiving, from a server (e.g., the server 105, FIG. 1), parameters of a model (e.g., the device model 136, FIG. 1), and content tags of media content items. In some embodiments, the model is trained based on features available on the device and using clusters created by the server based on user data from a set of user devices. Further in some embodiments, the content tags include content rankings of media content items for each of the clusters. In some embodiments, as represented by block 1022, the set of user devices operates in 2-way mode, e.g., the fully connected devices 110 in FIG. 1.

As represented by block 1030, the content selection method continues, with the user device executing, based on the device user data, the model using the parameters to generate one or more device cluster assignments of the profile to one or more clusters of the clusters. In some embodiments, as represented by block 1032, obtaining the device user data associated with the profile includes accumulating the device user data available on the device during a period of time (e.g., 1 week). In such embodiments, executing, based on the device user data, the model includes executing the model using device features derived from the accumulated device user data during the period of time in accordance with some embodiments. For example, the user device may accumulate one week of user actions as features for the device model to predict targeted content in order to achieve sufficient prediction precision.

As represented by block 1040, the content selection method continues, with the user device selecting one or more media content items for the profile based on the one or more device cluster assignments and the content tags. In some embodiments, the one or more device cluster assignments represent one or more probabilities of the profile being assigned to the one or more clusters. In such embodiments, selecting the one or more media content items for the profile based on the one or more device cluster assignments and the content tags includes calculating, for each of the media content items, a respective content ranking based on the one or more probabilities and the content rankings of the media content items, and selecting the one or more media content items for the profile based on the respective content ranking.

For example, in FIG. 8C, profile C 810-C is classified to cluster 1 820-1 with the probability value of 0.3 and to cluster 2 820-2 with the probability value of 0.7. Further in FIG. 8C, targeted content 1 630-1 is tagged with a content ranking value of 0.8 for cluster 1 620-1 and 0.3 for cluster 2 620-2. Based on the probability values of 0.3 and 0.7 and the content ranking values of 0.8 and 0.3, the user device calculates a respective content ranking value of 0.45 for targeted content 1 630-1. Applying the same calculation, the user device determines a respective content ranking value of 0.69 for targeted content 2 630-2 and 0.46 for targeted content 3 630-3. Accordingly, the user device selects content in the order of targeted content 2 630-2, targeted content 3 630-3, and targeted content 630-1 based on their respective content ranking values of 0.69, 0.46, and 0.45 in descending order.

Turning to FIG. 10B, as represented by block 1050, in some embodiments, the content selection method further includes receiving, from the server, rankings of the features and default values of the features, determining a subset of the features based on the rankings and characteristics of the device, and storing the user data corresponding to the subset of the features and the default values in the non-transitory memory. For example, in FIG. 4B, the server 105 trains a single device model 136-M for the user device 410-B. In such embodiments, the server 105 transmits the ranking of the features (e.g., according to explanatory power) and default values of the features (e.g., based for example on average over all the population). Further in such embodiments, the user device 410B decides, based on its memory profile, the number of user features to be stored in its persistent memory (e.g., feature 1 . . . x, ordered by the explanatory power) and puts default values for the rest (e.g., default values for the remaining M-x features).

As represented by block 1060, in some embodiments, the content selection method further includes executing the model to predict a set of media content items for a next period, and pre-fetching the set of media content items from the server prior to selecting the one or more media content items during the next period. For example, in FIG. 5 step 520, the user device periodically (e.g., every hour) pre-fetches targeted content. In order to pre-fetch the targeted content, in FIG. 5 steps 522 and 524, the user device retrieves the device cluster assignments 144 and predicts targeted content for the next period (e.g., next hour). The selected content is then downloaded, as shown in FIG. 5 step 526.

As represented by block 1070, in some embodiments, the one or more device cluster assignments are generated based on the device user data during a current period. In such embodiments, the content selection method further includes obtaining a set of device cluster assignments from a previous period, and updating the one or more device cluster assignments based on a weighted average of the one or more device cluster assignments and the set of device cluster assignments from the current period. For example, in FIG. 6, in the persistent memory, the user device stores the probability of assigning a profile to a cluster calculated from a previous period (e.g., 1 day ago) as $A_{stored}$. The user device calculates the probability of assigning the profile to the cluster based on the features from the current period (e.g., today) as $A_{current}$. The user device then revises the cluster assignment value stored in the persistent memory by applying a function of ($A_{current}$, $A_{stored}$), e.g., $A_{stored} = (A_{current} * \alpha + A_{stored} * \beta)/(\alpha+\beta)$, where $\alpha$ and $\beta$ are the weights.

As represented by block 1080, in some embodiments, the content selection method further includes using a first set of device cluster assignments stored in a first buffer as the one or more device cluster assignments during a current period, storing and updating in a second buffer a second set of device cluster assignments during the current period, and using the second set of device cluster assignments stored in the second buffer as the one or more device cluster assignments at the end of the current period. For example, in FIG. 7, a first set of device cluster assignments from a previous period is stored in buffer 1. Once a new model is trained, a second set of device cluster assignments is stored in buffer 2. The user device periodically (e.g., on a daily basis) updates both buffer 1 and buffer 2 using the method described with reference to FIG. 6 in accordance with some embodiments. At the end of the current period (e.g., after 7 days), the user device switches to using the cluster assignments stored in buffer 2 for content prediction.

Figure 11:
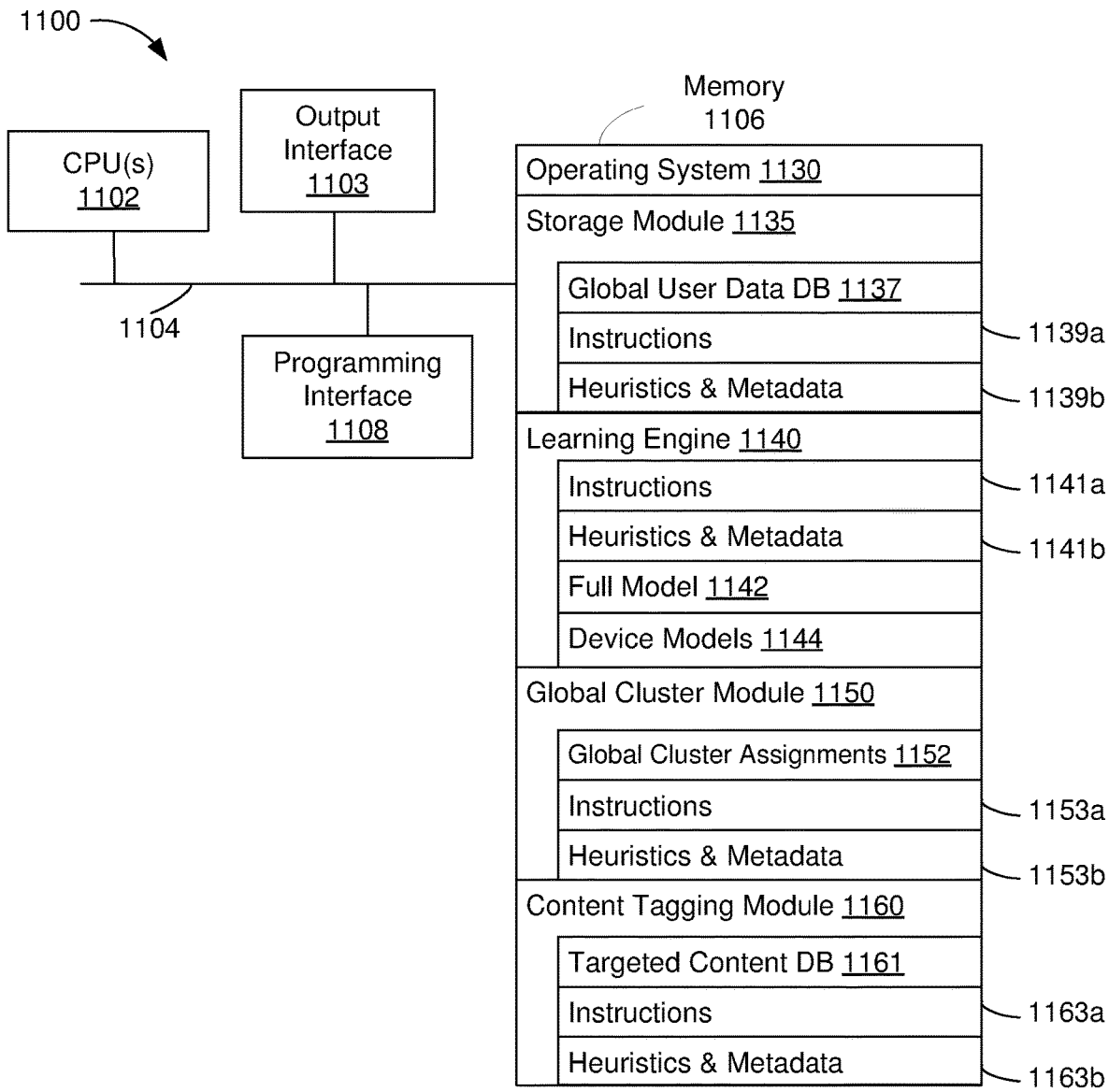
FIG. 11 is a block diagram of a computing device for model building in preparation for approximated personalization of targeted content, in accordance with some embodiments.

FIG. 11 is a block diagram of a computing device 1100 for model building in preparation for approximated personalization of targeted content in accordance with some embodiments. In some embodiments, the computing device 1100 corresponds to the server 105 in FIG. 1 and performs one or more of the functionalities described above with respect to the server 105. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments the computing device 1100 includes one or more processing units (CPU's) 1102 (e.g., processors), one or more output interfaces 1103 (e.g., a network interface), a memory 1106, a programming interface 1108, and one or more communication buses 1104 for interconnecting these and various other components.

In some embodiments, the communication buses 1104 include circuitry that interconnects and controls communications between system components. The memory 1106 includes high-speed random access memory, such as DRAM, SRAM, DDR RAM or other random access solid state memory devices; and, in some embodiments, include non-volatile memory, such as one or more magnetic disk storage devices, optical disk storage devices, flash memory devices, or other non-volatile solid state storage devices. The memory 1106 optionally includes one or more storage devices remotely located from the CPU(s) 1102. The memory 1106 comprises a non-transitory computer readable storage medium. Moreover, in some embodiments, the memory 1106 or the non-transitory computer readable storage medium of the memory 1106 stores the following programs, modules and data structures, or a subset thereof including an optional operating system 1130, a storage module 1135, a learning engine 1140, a global cluster module 1150, and a content tagging module 1160. In some embodiments, one or more instructions are included in a combination of logic and non-transitory memory. The operating system 1130 includes procedures for handling various basic system services and for performing hardware dependent tasks.

In some embodiments, the storage module 1135 is configured to store and/or manage a global user data database 1137 (e.g., the global user data database 130, FIG. 1). To that end, the storage module 1135 includes a set of instructions 1139a and heuristics and metadata 1139b.

In some embodiments, the learning engine 1140 (e.g., the learning engine 132 112, FIG. 1) is configured to handle model building based on the data stored in the storage module 1135, including building a full model 1142 and a plurality of device models 1144 as described above with reference to FIGS. 1 and 2. To that end, the learning engine 1140 includes a set of instructions 1141a and heuristics and metadata 1141b.

In some embodiments, the global cluster module 1150 is configured to derive global cluster assignments 1152 from the full model 1142. To that end, the global cluster module 1150 includes a set of instructions 1153a and heuristics and metadata 1153b.

In some embodiments, the content tagging module 1160 is configured to label content stored in a targeted content database 1161 with content rankings for clusters in the global cluster assignments 1152. To that end, the content tagging module 1160 includes a set of instructions 1161a and heuristics and metadata 1161b.

Although the storage model 1135, the learning engine 1140, the global cluster module 1150, and the content tagging module 1160 are illustrated as residing on a single computing device 1100, it should be understood that in other embodiments, any combination of the storage model 1135, the learning engine 1140, the global cluster module 1150, and the content tagging module 1160 can reside in separate computing devices in various embodiments. For example, in some embodiments, each of the storage model 1135, the learning engine 1140, the global cluster module 1150, and the content tagging module 1160 resides on a separate computing device.

Moreover, FIG. 11 is intended more as functional description of the various features which are present in a particular implementation as opposed to a structural schematic of the embodiments described herein. As recognized by those of ordinary skill in the art, items shown separately could be combined and some items could be separated. For example, some functional modules shown separately in FIG. 11 could be implemented in a single module and the various functions of single functional blocks could be implemented by one or more functional blocks in various embodiments. The actual number of modules and the division of particular functions and how features are allocated among them will vary from one embodiment to another, and may depend in part on the particular combination of hardware, software and/or firmware chosen for a particular embodiment.

Figure 12:
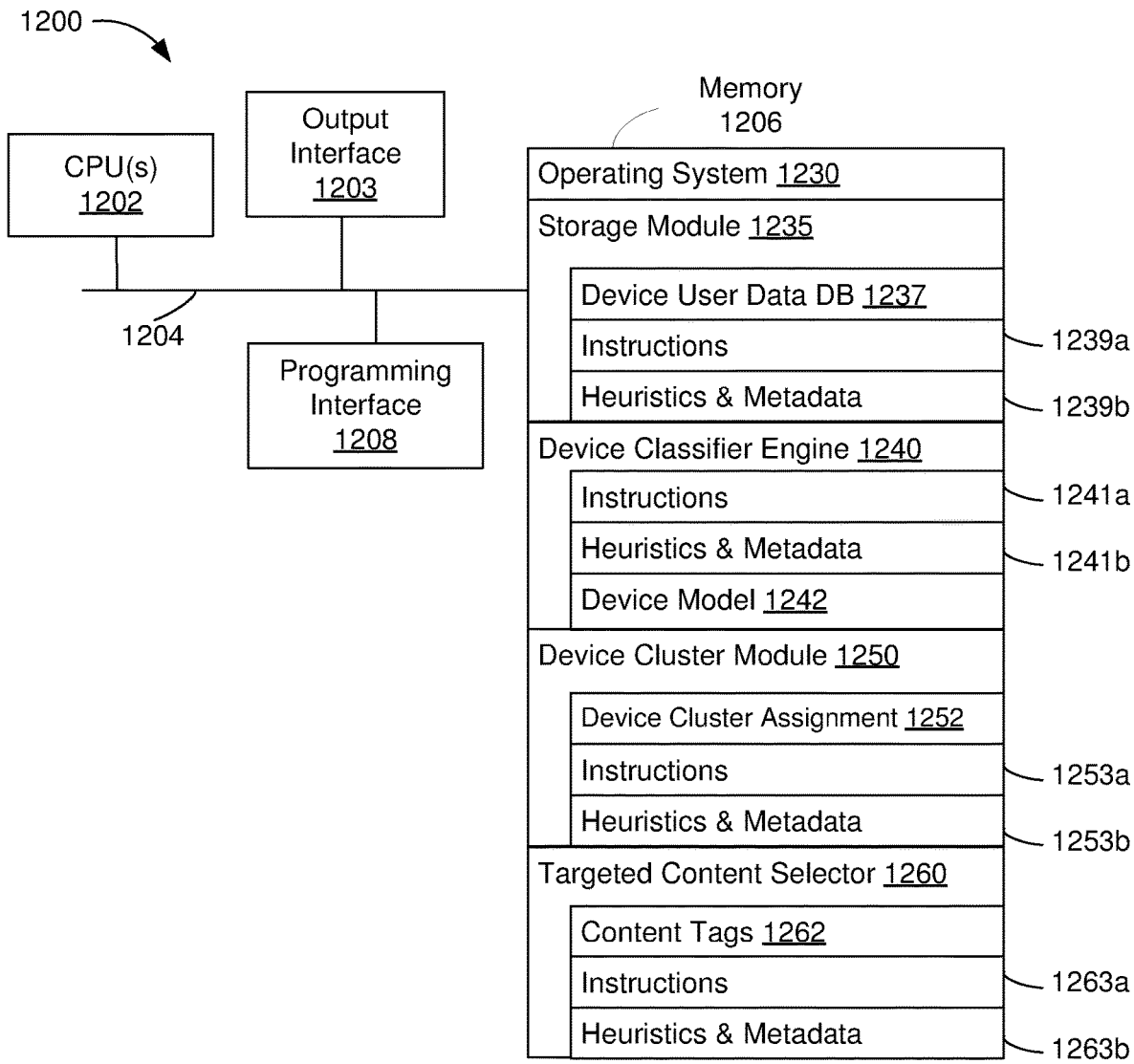
FIG. 12 is a block diagram of a computing device for selecting targeted media content items, in accordance with some embodiments.

FIG. 12 is a block diagram of a computing device 1200 for selecting targeted media content items in accordance with some embodiments. In some embodiments, the computing device 1200 corresponds to one of the fully connected devices 110 or weakly connected devices 120 in FIG. 1 and performs one or more of the functionalities described above with respect to the fully connected device 110 and/or the weakly connected device 120. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments the computing device 1200 includes one or more processing units (CPU's) 1202 (e.g., processors and/or controllers), one or more output interfaces 1203 (e.g., a network interface), a memory 1206, a programming interface 1208, and one or more communication buses 1204 for interconnecting these and various other components.

In some embodiments, the communication buses 1204 include circuitry that interconnects and controls communications between system components. The memory 1206 includes high-speed random access memory, such as DRAM, SRAM, DDR RAM or other random access solid state memory devices; and, in some embodiments, include non-volatile memory, such as one or more magnetic disk storage devices, optical disk storage devices, flash memory devices, or other non-volatile solid state storage devices. The memory 1206 optionally includes one or more storage devices remotely located from the CPU(s) 1202. The memory 1206 comprises a non-transitory computer readable storage medium. Moreover, in some embodiments, the memory 1206 or the non-transitory computer readable storage medium of the memory 1206 stores the following programs, modules and data structures, or a subset thereof including an optional operating system 1230, a storage model 1235, a device classifier engine 1240, a device cluster module 1250, and a targeted content selector 1260. In some embodiments, one or more instructions are included in a combination of logic and non-transitory memory. The operating system 1230 includes procedures for handling various basic system services and for performing hardware dependent tasks.

In some embodiments, the storage module 1235 is configured to store and/or manage a device user data database 1237 (e.g., the device user data database 140, FIG. 1). To that end, the storage module 1135 includes a set of instructions 1139a and heuristics and metadata 1139b.

In some embodiments, the device classifier engine 1240 (e.g., the device classifier engine 142, FIG. 1) is configured to execute a device model 1242 trained by the server in order to classify the device (or a profile) to a cluster based on the data stored in the storage module 1235. To that end, the device classifier engine 1240 includes a set of instructions 1241a and heuristics and metadata 1241b.

In some embodiments, the device cluster module 1250 is configured to derive one or more device cluster assignments 1252 classified by the device model 1242 based on the device user data stored in the storage module 1235. To that end, the device cluster module 1250 includes a set of instructions 1253a and heuristics and metadata 1253b.

In some embodiments, the targeted content selector 1260 is configured to select targeted content based on content tags 1262 received from the server and the device cluster assignment 1252. To that end, the targeted content selector 1260 includes a set of instructions 1263a and heuristics and metadata 1263b.

Although the storage module 1235, the device classifier engine 1240, the device cluster module 1250, and the targeted content selector 1260 are illustrated as residing on a single computing device 1200, it should be understood that in other embodiments, any combination of the storage module 1235, the device classifier engine 1240, the device cluster module 1250, and the targeted content selector 1260 can reside in separate computing devices in various embodiments. For example, in some embodiments, each of the storage module 1235, the device classifier engine 1240, the device cluster module 1250, and the targeted content selector 1260 resides on a separate computing device.

Moreover, FIG. 12 is intended more as functional description of the various features which are present in a particular implementation as opposed to a structural schematic of the embodiments described herein. As recognized by those of ordinary skill in the art, items shown separately could be combined and some items could be separated. For example, some functional modules shown separately in FIG. 12 could be implemented in a single module and the various functions of single functional blocks could be implemented by one or more functional blocks in various embodiments. The actual number of modules and the division of particular functions and how features are allocated among them will vary from one embodiment to another, and may depend in part on the particular combination of hardware, software and/or firmware chosen for a particular embodiment.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first device could be termed a second device, and, similarly, a second device could be termed a first device, which changing the meaning of the description, so long as all occurrences of the "first device" are renamed consistently and all occurrences of the "second device" are renamed consistently. The first device and the second device are both devices, but they are not the same device.

The terminology used herein is for the purpose of describing particular embodiments only and is not intended to be limiting of the claims. As used in the description of the embodiments and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting", that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The invention claimed is:

1. A method comprising:
at a device including a processor and a non-transitory memory:
obtaining device user data associated with a profile;
receiving, from a server, parameters of a model and content tags of media content items, wherein the model is trained based on features available on the device and using clusters created by the server based on user data from a set of user devices and the content tags include content rankings of media content items for each of the clusters, wherein the set of user devices is fully connected to the server and operates in 2-way mode, and the device is a weakly connected device operating in 1-way mode with limited connectivity to report the user data to the server;
executing, based on the device user data, the model using the parameters to generate one or more device cluster assignments of the profile to one or more clusters of the clusters; and
selecting one or more media content items for the profile based on the one or more device cluster assignments and the content tags.

2. The method of claim 1, wherein:
obtaining the device user data associated with the profile includes accumulating the device user data available on the device during a period of time; and executing, based on the device user data, the model includes executing the model using device features derived from the accumulated device user data during the period of time.

3. The method of claim 1, wherein:
the one or more device cluster assignments represent one or more probabilities of the profile being assigned to the one or more clusters; and
selecting the one or more media content items for the profile based on the one or more device cluster assignments and the content tags includes:
calculating, for each of the media content items, a respective content ranking based on the one or more probabilities and the content rankings of the media content items; and
selecting the one or more media content items for the profile based on the respective content ranking.

4. The method of claim 1, further comprising:
receiving, from the server, rankings of the features and default values of the features;
determining a subset of the features based on the rankings and characteristics of the device; and
storing the user data corresponding to the subset of the features and the default values in the non-transitory memory.

5. The method of claim 1, further comprising:
executing the model to predict a set of media content items for a next period; and
pre-fetching the set of media content items from the server prior to selecting the one or more media content items during the next period.

6. The method of claim 1, wherein the one or more device cluster assignments are generated based on the device user data during a current period, and the method further includes:
obtaining a set of device cluster assignments from a previous period; and
updating the one or more device cluster assignments based on a weighted average of the one or more device cluster assignments and the set of device cluster assignments from the current period.

7. The method of claim 1, further comprising:
using a first set of device cluster assignments stored in a first buffer as the one or more device cluster assignments during a current period;
storing and updating in a second buffer a second set of device cluster assignments during the current period; and
using the second set of device cluster assignments stored in the second buffer as the one or more device cluster assignments at the end of the current period.

8. A non-transitory memory storing one or more programs, which, when executed by one or more processors of a device, cause the device to:
obtain device user data associated with a profile;
receive, from a server, parameters of a model and content tags of media content items, wherein the model is trained based on features available on the device and using clusters created by the server based on user data from a set of user devices, and the content tags include content rankings of media content items for each of the clusters, wherein the set of user devices is fully connected to the server and operates in 2-way mode, and the device is a weakly connected device operating in 1-way mode with limited connectivity to report the user data to the server;
execute, based on the device user data, the model using the parameters to generate one or more device cluster assignments of the profile to one or more clusters of the clusters; and
select one or more media content items for the profile based on the one or more device cluster assignments and the content tags.

9. The non-transitory memory of claim 8, wherein:
obtaining the device user data associated with the profile includes accumulating the device user data available on the device during a period of time; and
executing, based on the device user data, the model includes executing the model using device features derived from the accumulated device user data during the period of time.

10. The non-transitory memory of claim 8, wherein:
the one or more device cluster assignments represent one or more probabilities of the profile being assigned to the one or more clusters; and
selecting the one or more media content items for the profile based on the one or more device cluster assignments and the content tags includes:
calculating, for each of the media content items, a respective content ranking based on the one or more probabilities and the content rankings of the media content items; and
selecting the one or more media content items for the profile based on the respective content ranking.

11. The non-transitory memory of claim 8, wherein the one or more programs, which, when executed by the one or more processors of the device, further cause the device to:
receive, from the server, rankings of the features and default values of the features;
determine a subset of the features based on the rankings and characteristics of the device; and
store the user data corresponding to the subset of the features and the default values in the non-transitory memory.

12. The non-transitory memory of claim 8, wherein the one or more programs, which, when executed by the one or more processors of the device, further cause the device to:
execute the model to predict a set of media content items for a next period; and
pre-fetch the set of media content items from the server prior to selecting the one or more media content items during the next period.

13. The non-transitory memory of claim 8, wherein the one or more device cluster assignments are generated based on the device user data during a current period, and the one or more programs, which, when executed by the one or more processors of the device, further cause the device to:
obtain a set of device cluster assignments from a previous period; and
update the one or more device cluster assignments based on a weighted average of the one or more device cluster assignments and the set of device cluster assignments from the current period.

14. The non-transitory memory of claim 8, wherein the one or more programs, which, when executed by the one or more processors of the device, further cause the device to:
use a first set of device cluster assignments stored in a first buffer as the one or more device cluster assignments during a current period;
store and update in a second buffer a second set of device cluster assignments during the current period; and use the second set of device cluster assignments stored in the second buffer as the one or more device cluster assignments at the end of the current period.

15. A device comprising:
a processor;
a non-transitory memory; and
one or more programs stored in the non-transitory memory, which, when executed by the processor, cause the device to:
obtain device user data associated with a profile;
receive, from a server, parameters of a model and content tags of media content items, wherein the model is trained based on features available on the device and using clusters created by the server based on user data from a set of user devices, and the content tags include content rankings of media content items for each of the clusters, wherein the set of user devices is fully connected to the server and operates in 2-way mode, and the device is a weakly connected device operating in 1-way mode with limited connectivity to report the user data to the server;
execute, based on the device user data, the model using the parameters to generate one or more device cluster assignments of the profile to one or more clusters of the clusters; and
select one or more media content items for the profile based on the one or more device cluster assignments and the content tags.

16. The device of claim 15, wherein:
obtaining the device user data associated with the profile includes accumulating the device user data available on the device during a period of time; and
executing, based on the device user data, the model includes executing the model using device features derived from the accumulated device user data during the period of time.

17. The device of claim 15, wherein:
the one or more device cluster assignments represent one or more probabilities of the profile being assigned to the one or more clusters; and
selecting the one or more media content items for the profile based on the one or more device cluster assignments and the content tags includes:
calculating, for each of the media content items, a respective content ranking based on the one or more probabilities and the content rankings of the media content items; and
selecting the one or more media content items for the profile based on the respective content ranking.

18. The device of claim 15, wherein the one or more programs, which, when executed by the processor, further cause the device to:
receive, from the server, rankings of the features and default values of the features;
determine a subset of the features based on the rankings and characteristics of the device; and
store the user data corresponding to the subset of the features and the default values in the non-transitory memory.

19. The device of claim 15, wherein the one or more programs, which, when executed by the processor, further cause the device to:
execute the model to predict a set of media content items for a next period; and
pre-fetch the set of media content items from the server prior to selecting the one or more media content items during the next period.

20. The device of claim 15, wherein the one or more device cluster assignments are generated based on the device user data during a current period, and the one or more programs, which, when executed by the processor, further cause the device to:
obtain a set of device cluster assignments from a previous period; and
update the one or more device cluster assignments based on a weighted average of the one or more device cluster assignments and the set of device cluster assignments from the current period.

* * * * *